(12) United States Patent
Chen et al.

(10) Patent No.: US 12,255,969 B2
(45) Date of Patent: Mar. 18, 2025

(54) ANALYZING USER ACTIVITY

(71) Applicant: Comcast Cable Communications, LLC, Philadelphia, PA (US)

(72) Inventors: Tianwen Chen, McLean, VA (US); Hongcheng Wang, Arlington, VA (US); Ding Zhou, New York, NY (US); Yonatan Vaizman, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 620 days.

(21) Appl. No.: 17/231,884

(22) Filed: Apr. 15, 2021

(65) Prior Publication Data

US 2022/0337440 A1 Oct. 20, 2022

(51) Int. Cl.
*H04L 67/1097* (2022.01)
*G06F 11/34* (2006.01)
*H04L 43/16* (2022.01)
*H04L 67/50* (2022.01)
*H04L 67/54* (2022.01)

(52) U.S. Cl.
CPC .......... *H04L 67/54* (2022.05); *G06F 11/3438* (2013.01); *H04L 43/16* (2013.01); *H04L 67/535* (2022.05)

(58) Field of Classification Search
CPC ....... H04L 67/535; H04L 67/54; H04L 43/16; G06F 11/3438; H04M 15/58
USPC ........................................................ 709/223
See application file for complete search history.

(56) References Cited

U.S. PATENT DOCUMENTS

| | | | | |
|---|---|---|---|---|
| 11,196,825 | B2 * | 12/2021 | McSchooler | H04L 67/535 |
| 11,755,449 | B1 * | 9/2023 | Slavin | H04L 63/102 |
| | | | | 709/224 |
| 2016/0242194 | A1 * | 8/2016 | Mitola | H04L 5/0037 |
| 2018/0262991 | A1 * | 9/2018 | Rao | H04W 52/0261 |
| 2019/0327600 | A1 * | 10/2019 | Kapilevich | H04W 8/005 |
| 2021/0076212 | A1 * | 3/2021 | Manikantan Shila | |
| | | | | H04W 12/065 |

FOREIGN PATENT DOCUMENTS

WO  WO-2016193060 A1 * 12/2016 ........... G06F 21/316

* cited by examiner

*Primary Examiner* — Cheikh T Ndiaye
(74) *Attorney, Agent, or Firm* — BakerHostetler

(57) ABSTRACT

At least one device can be classified based on user activity. At least one telemetry variable with respect to time may be received for the at least one device. The at least one telemetry variable with respect to time may be used to determine an activity model for the at least one device. Based on the activity model, a probability of the at least one device belonging to a profile or to a type of user may be determined. Based on the type of user of the at least one device, a setting associated with the at least one device may be changed.

20 Claims, 11 Drawing Sheets

ANALYZING USER ACTIVITY

BACKGROUND

One or more devices in a household may be grouped into profiles, with each profile representing a household member. Household profiling may be used to provide personalized services to members of a household. For example, household profiling may allow a customer to pause or un-pause all devices assigned to a certain profile. However, household profiling may require unreliable and manual input from members of the household. For example, a member of the household may need to identify the devices in the household and manually assign each device to a profile or manually create new profiles. The household member may forget to assign a new device to a profile or the household member may not even be aware that devices can be assigned to profiles. Household profiling may also involve intrusive techniques. For example, security cameras may be deployed to perform facial recognition on the members of the household to automatically assign devices to profiles. Therefore, improvements in household profiling techniques are needed.

SUMMARY

Methods and systems are disclosed herein that enable devices to be grouped into profiles based on user activity, such as internet usage. Multiple devices, such as Internet access devices, may be used within a household. An activity model of each device may be determined. The activity model may indicate the online activity of each device over time. For example, the activity model may indicate a temporal pattern in Internet usage of each device. Based on the activity model, each device may be grouped in a profile. The profile may indicate, for example, a primary user of each device. The profile of each user may also include a primary device and secondary devices. Based on the activity model, each device may be classified based on a type of user. The type of user may indicate, for example, a type of primary user of each device. If a device is classified based on a type of user, a setting associated with the device may be changed based on the classification. The setting may be a restriction on access to content, such as Internet content.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
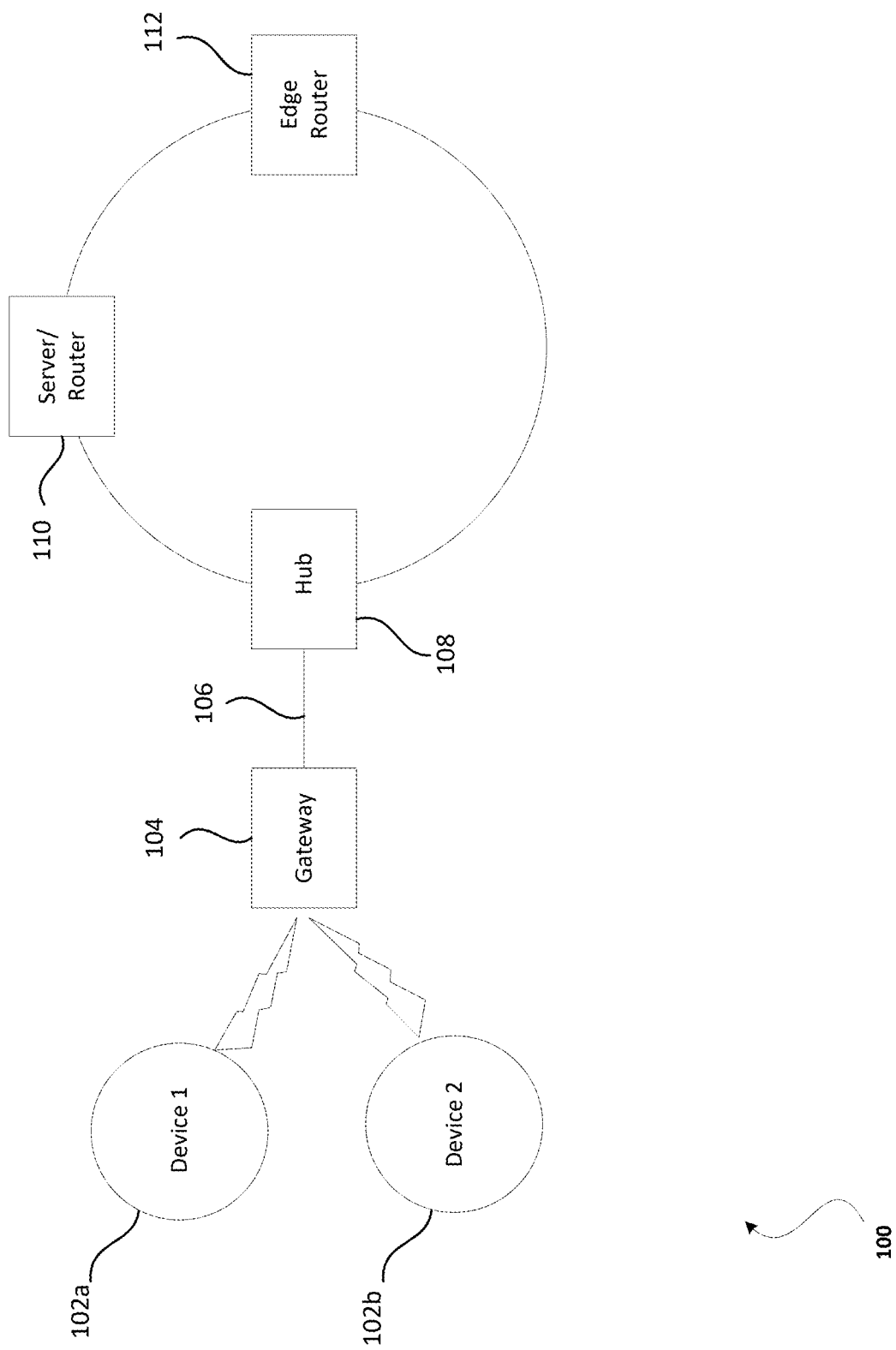
FIG. 1 is a diagram illustrating an example communications network.

Methods and systems are disclosed that enable devices to be classified based on user activity. The user activity associated with a device may be utilized to determine one or more users of the device, such as a primary user and/or a secondary user. The primary user of the device may, for example, be a member of a household that owns the device, and/or a member of a household that uses the device most frequently. The secondary user of the device may, for example, be an additional member of the household that owns the device, and/or an additional member of the household that uses the device most frequently.

The user activity of a device may indicate when the device is being used by a member of a household and/or how the household member is using the device during that time. The user activity of a device may additionally, or alternatively, indicate when the device is not being used by a member of a household. For example, the user activity of a device may indicate when the device is connected to the Internet and/or when the device is not connected to the Internet. The user activity of a device may be represented as an activity model. For example, the activity model may be a time series model representative of that device's usage patterns over time. The activity model may be used to determine the one or more users of the device. For example, if the activity model associated with a first device is similar to the activity model associated with a second device that is known to be used by a particular household member, this may indicate that the two devices are often connected to the Internet at the same time. If the two devices are often connected to the Internet at the same time, it may be determined that the first and second devices are associated with that same household member.

Each user in a household may be associated with a profile. For example, the profile associated with a user may indicate the devices for which that user is the primary user and/or the secondary user. If it is determined that the device is associated with a particular user, it may be determined that the device is associated with that particular user's profile. Accordingly, if a profile is determined for the device, the profile may indicate a user of the device. A single device may belong to only one profile if it is used by only one member of the household, or a single device may belong to a plurality of profiles if it is a device that is shared amongst multiple members of the household. If two devices are associated with the same profile, the two devices may have the user. For example, if a tablet and a laptop are both associated with a single profile, the tablet and the laptop may both belong to the same household member.

The user activity associated with a device may alternatively, or additionally, be used to determine a type of user for the device, such as a type of primary user for the device. To determine the type of user for a device, the user activity associated with the device may be used to determine a demographic of a primary user of the device, such as a gender and/or age group of the user of the device. For example, the user activity associated with a device may be used to determine that the device is primarily used by a child or by an adult. If the user activity of a device indicates that the device is primarily used by a child, this may indicate that the device is associated with a child. It may be determined that the type of user for the device is a child. If the user activity of a device indicates that the device is primarily used by an adult, this may indicate that the device is associated with an adult. It may be determined that the type of user for the device is an adult.

As discussed above, the user activity of a device may indicate when the device is being used by a member of a household and/or how the household member is using the device during that time. For example, the user activity of a device may indicate when the household member is using the device is to connect to the Internet. To determine the user activity of a device, online activity variables may be collected for that device. For example, online activity variables may be based off of telemetry data that is automatically collected for that device at a gateway device. The online activity variables collected for a device may indicate the user activity of the device, and may include, for example, Wi-fi data for the device. The online activity variables may be sampled periodically, such as every 15 minutes, for a certain amount of time, such as for a two-week period. As the online activity variables may be automatically collected, such as at a gateway device, user input may be unnecessary. Eliminating the need for user input may improve the accuracy of the device classification, as user input is often unreliable.

The online activity variables associated with a device may indicate the usage of that device over time. The online activity variables may be based off of telemetry data that is automatically collected for that device at a gateway device. Telemetry data may include, for example, when that device is or is not connected to the internet, how much information that device is uploading and/or downloading, or a received signal strength indication (RSSI) of the device. For example, the online activity variables may include, but are not limited to at least one of the device's internet connectivity over time, an amount of information downloaded by the device in a recent time interval, an amount of information uploaded by the device in a recent time interval, or a RSSI over time, and/or any other online activity with respect to time. For example, the online activity variables associated with each device may include an amount of information downloaded or uploaded by the device within the past 15 minutes.

Each device's user activity may be represented as an activity model. The activity model for a particular device may be generated based on one or more of the collected online activity variables, and may be representative of that device's usage patterns over time. For example, the activity model may be a time series model. The activity model may be generated based on more than one collected online activity variable. For example, if the collected online activity variables for a device include when that device is or is not connected to the internet, how much information that device is uploading and/or downloading, or a received signal strength indication (RSSI) of the device, the activity model for the device may be based on more than one of these variables. For example, the activity model may include four dimensions, such as internet connectivity, bytes downloaded, bytes uploaded, and RSSI, with values for each dimension taken every 15 minutes for a period, such as a period of two weeks.

As discussed above, a device's activity model may be used to determine a user, such as a primary and/or secondary user, of the device. A device's activity model may be compared to activity models of other devices in the household. By comparing a device's activity model to the activity models of other devices in the household, it may be determined if the user activity of that device is similar to the user activity of any of the other devices in the household. If the user activity of the device is similar to the user activity of one or more other devices in the household, this may indicate that all of these devices share a user, such as a primary user and/or a secondary user, and should therefore be associated with the same profile (e.g. the profile associated with the user). For example, if two devices are frequently connected to the internet at the same time, this may indicate that these two devices share a user, and should therefore both be associated with the profile associated with that user.

A classifier may be used to determine whether two devices have a common user and should therefore be associated with the same profile. The classifier may output a probability of two devices belonging to the same user, based on a comparison of the activity models of these two devices. In addition to comparing the activity models of the two devices, the classifier may use other device information, such as information about the device-type of each of the two devices, to determine the probability that the two devices belong to the same user. The device-type of each of the two devices may be, for example, a phone, a laptop, a smart watch, a gaming device, a tablet, a thermostat, or any other type of device. The classifier may also use the brand of each of the two devices to determine the probability that the two devices belong to the same user. For example, if the two devices are both Apple devices, this may indicate a higher likelihood of the two devices belonging to the same user, as this user may prefer Apple devices.

The device-type information may be used by the classifier in a number of ways. For example, if two devices are the same type of device, this may make it less likely that the two devices belong to the same profile. For example, if the two devices are both laptops, this may indicate that the two devices are less likely to belong to the same user because a single household member is not likely to own two laptops. Additionally, or alternatively, the classifier may use the device-type information to determine the likelihood that a particular device is a shared or a core device. A shared device is a device that is used by more than one member of the household, whereas a core device is a device used by a single user and is not shared amongst different users in the household. Different types of devices may be more likely to be shared devices than other types of devices. For example, a tablet is more likely to be used by multiple members of a household than a phone is. The phone may be more likely to be a core device than the tablet is.

If the activity models of the two devices are similar, this may indicate that two devices share a primary user and should therefore be aassociated with the same profile. However, a single device may be associated with more than one profile. A single device may be associated with more than one profile if it is a shared device. Conversely, a single device may be associated with only one profile if is a core device.

The level of similarity between the two device's activity models may indicate whether the two devices are both core devices used solely by a single household user, or if at least one of the two devices is a shared device. For example, the more similar the two activity models are, the more likely that the two devices are core devices belonging to the same user. Conversely, if the two activity models share some similarities but also share some noticeable difference, at least one of the two devices may be a shared device. To determine if the two devices are both core devices, the probability determined by the classifier may be compared with a first threshold. If the probability determined by the first classifier complies with the first threshold, this may indicate that the two devices are both core devices belonging to the same user. If the probability does not comply with the first threshold, but rather complies with a second, lower threshold, this may indicate that at least one of the two devices is a shared device, but that the two devices have at least one primary user in common. Accordingly, if the probability complies with either the first or second threshold, this may indicate that the two devices belong to at least one of the same profiles. Conversely, if the probability complies with neither the first nor second threshold, this may indicate that the two devices do not belong to the same profile.

As described above, certain types of devices are more likely to be shared devices, and other types of devices are more likely to be core devices. For devices that are more likely to be shared, such as a tablet, a desktop computer, or an Xbox, the probability of these devices belonging to a particular user may have to satisfy a higher threshold in order to determine that they are associated with that user's profile. For example, to determine that these devices are associated with a user's profile, the activity models of these likely-shared devices may need to be more similar to the activity models of devices already associated with that particular user's profile. Conversely, for devices that are less likely to be shared, such as a phone or a watch, the probability of these devices belonging to a particular user may only have to satisfy a lower threshold in order to determine that they are associated with that user's profile. For example, to determine that these devices are associated with a user's profile, the activity models of these not-likely-shared devices may need to have some similarity to the activity models of devices already associated with that particular user's profile, but not as high a similarity as the likely-shared devices.

The classifier used to determine whether two devices share a primary user and should therefore be associated with the same profile may be a linear classifier or a more complicated machine learning model, such as a non-linear or neural network model. The machine learning model may be trained to use past data from households that have established profiles for the household devices. This past data may include examples of pairs of household devices that are in the same profile and examples of pairs of devices that are in the same household but in different profiles. The examples of pairs of devices that are in the same profile may be used as positive training data for the machine learning model. The examples of pairs of devices that are in the same household but in different profiles may be used as negative training data for the machine learning model.

Once defined profiles have been created for a household and devices have been grouped in the profiles, a new device added to the household may be grouped into an existing profile. For example, if a household acquires a new tablet, this new tablet may be grouped into one or more existing profiles for the household. When a new device is added to the household, online activity variables may be periodically collected for the new device, such as every 15 minutes for two weeks. An activity model for the new device may be generated based on the collected online activity variables. The classifier may predict the pair-probability of the new device with each of the existing devices to determine which of the already defined profiles the new device should be grouped in. To predict the pair-probability of the new device with each of the existing devices, the classifier may determine the similarity between the new device's activity model and the activity models of each of the existing devices. The new device may be grouped in the profile(s) that has the highest association probability with existing devices in the profile.

The profiles may be automatically updated as devices change primary users or as new devices are added. The classifier may repeat the above steps in a rolling window approach to detect any changes to the device-profile associations. Recommendations to update or change the profiles classifications may be provided to customers, such as to the head of the household. For example, a recommendation message to update or change the profile classifications may be sent to a device belonging to the head of the household.

A device's activity model may additionally, or alternatively, be used to determine a type of user associated with a device. To classify the devices into a type of user, the device's activity model may be used to determine usage times for the device. For example, the device's activity model may be used to determine time periods during which the device is being used by a member of the household. The usage times may indicate, for example, whether the device is typically used during one of more of the mornings, afternoons, or evenings. The usage times may indicate a type of user of the device. For example, a child is less likely to be using a household device, such as a tablet, during the mornings or afternoons during the school year. A child may also be less likely to be using a device during late evening hours, such as after 10 p.m. Conversely, an adult may be more likely to be using a household device during the mornings of afternoons during the school year, or during late evening hours.

The classifier may be used to determine whether a device has a particular type of primary user and to classify the device into a "type of user," accordingly. The classifier may determine the usage times for the device based off of the activity model for the device and use the usage times to determine whether the device is likely to belong to a particular type of user. For example, the classifier may determine a probability that the device belongs to a particular type of user, such as a child or an adult. The "type of user" classification for the device may be stored and used to control various aspects of the device. For example, based on a device's "type of user" classification, a setting for the device may be automatically changed. For example, if a device is classified as a "child" device, a parental control setting may be automatically turned on for the device.

As described above, a device may be classified, based on its activity model, in both a profile and a "type of user." As a device may be classified in more than one profile if it is a shared device, a device may be classified in more than one profile and a "type of user." Alternatively, a device may be classified in a profile but not in a "type of user," or a device may be classified in a "type of user" and not in a profile. By classifying devices based on activity models generated from online activity variables, the need to rely on undependable user input or intrusive monitoring techniques is eliminated.

Certain types of devices are more likely to be shared devices, and other types of devices are more likely to be core devices. For devices that are more likely to be shared, such as a tablet, a desktop computer, or an Xbox, the probability of these devices belonging to a particular user may have to satisfy a higher threshold in order to determine that they are associated with that user's profile. For example, to determine that these devices are associated with a user's profile, the activity models of these likely-shared devices may need to be more similar to the activity models of devices already associated with that particular user's profile. Conversely, for devices that are less likely to be shared, such as a phone or a smart watch, the probability of these devices belonging to a particular user may only have to satisfy a lower threshold in order to determine that they are associated with that user's profile. For example, to determine that these devices are associated with a user's profile, the activity models of these not-likely-shared devices may need to have some similarity to the activity models of devices already associated with that particular user's profile, but not as high a similarity as the likely-shared devices.

FIG. 1 is a diagram illustrating an example communications network 100 in which the methods described herein may be employed. The communications network 100 may comprise any communications network that supports Internet Protocol (IP) connectivity, including IPv4, IPv6, etc. The communications network 100 of FIG. 1 may provide communication services to a plurality of subscribers. Each subscriber may have a gateway 104, which may also be referred to as a home gateway. The gateway 104 may also sometimes be referred to as customer premises equipment (CPE). The gateway 104 may be in the form of a set-top box, router, extender, or the like, and the gateway 104 may include an embedded cable modem (not shown). Although only one gateway 104 is depicted in FIG. 1, it is understood that there may be many subscribers to the services of the communications network, each of which may have a similar gateway 104.

The gateway 104 may be configured to enable subscriber devices, such as devices 102a and 102b, to establish a wired or wireless connection to the gateway for purposes of communicating with the gateway and other network apparatuses beyond the gateway. The gateway 104 may be configured to establish a wired and/or wireless local area network to which the devices may connect. For purposes of communicating wirelessly, the gateway 104 may implement a wireless access technology, such as the IEEE 802.11 ("Wi-Fi") radio access technology. In other implementations, other radio access technologies may be employed, such as IEEE 802.16 or 802.20 ("WiMAX"), IEEE 802.15.4a ("Zigbee"), or 802.15.3c ("UWB"). For purposes of communicating with the gateway 104 via a wired connection, the gateway may be configured to implement a wired local area network technology, such as IEEE 802.3 ("Ethernet") or the like.

A device connected to the gateway 104, such as the devices 102a and 102b, may comprise any of a variety of different types of wireless devices, including for example, a smartphone, a tablet computer, a laptop computer, a notebook computer, a personal computer, a personal digital assistant (PDA), a user equipment (UE), a mobile station, a fixed or mobile subscriber unit, a pager, a wireless sensor, other consumer electronics, and the like.

As further shown, the communications network 100 further comprises a communications hub 108, server, distribution center, central location, or the like. The hub 108 may be in communication with each subscriber gateway 104 via a communications medium 106. The communications medium 106 may take any of a variety of forms, including a coaxial cable network, a fiber-optic cable network, a hybrid fiber-coaxial (HFC) network, a satellite transmission channel, or the like. When part of a cable television system, the hub 108 may comprise a cable modem termination system (CMTS). The hub 108 enables devices, such as devices 102a and 102b, to communicate with a service provider Internet Protocol (IP) network via their respective gateway 104.

The service provider Internet protocol (IP) network provides various services to subscriber devices 102a, 102b, and includes the appropriate infrastructure for these services. As shown, the service provider IP network may include one or more servers or routers, such as server/router 110. Such network servers/routers may comprise a Domain Name System (DNS) server, a dynamic host configuration protocol (DHCP) server, a voice over Internet protocol (VoIP) server, a network management server, or any other server or router needed to provide desired services to subscribers. The service provider network may also comprise one or more edge routers, such as edge router 112, which may provide connectivity to other networks, including the Internet, a telephone network, or the like.

Figure 2:
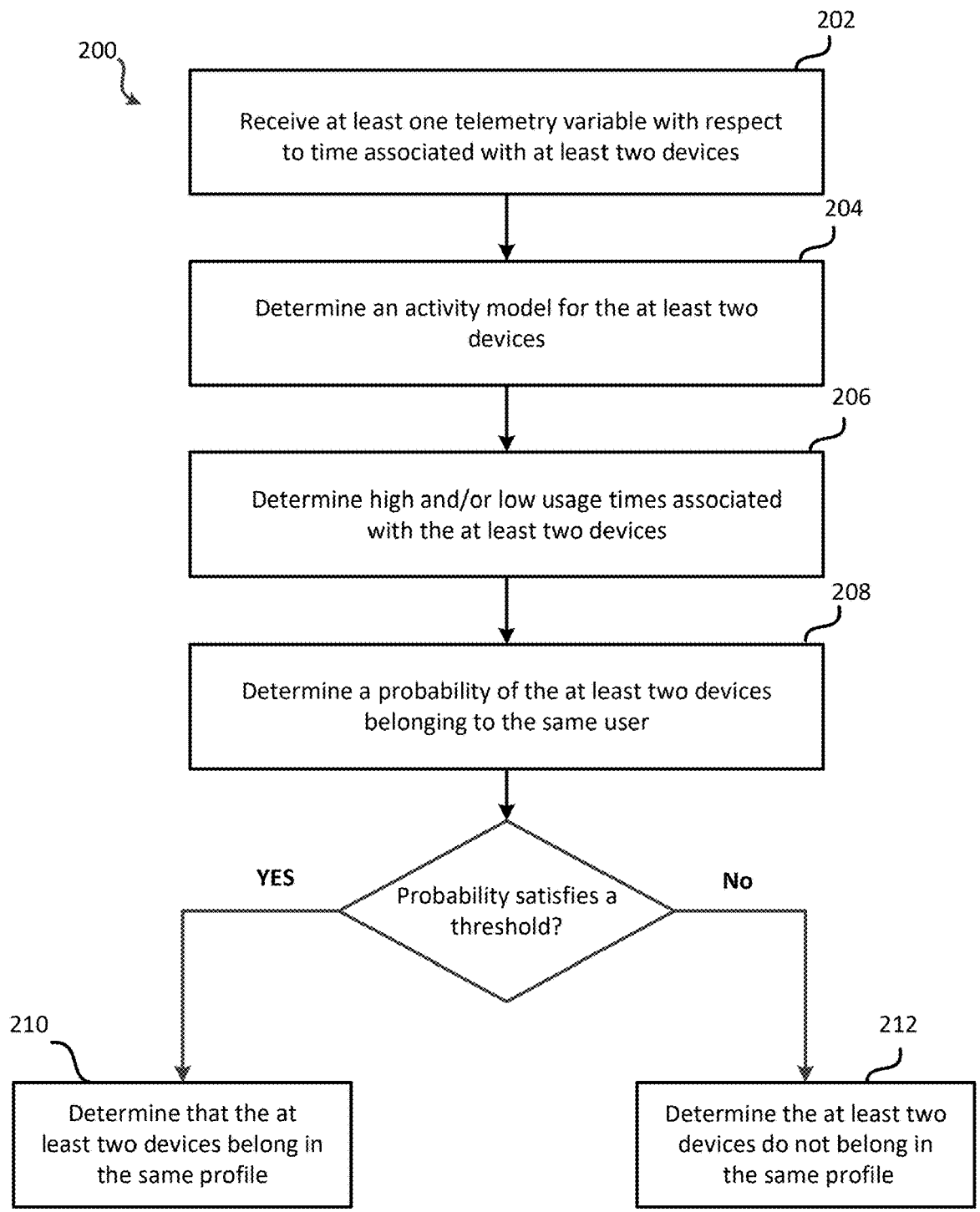
FIG. 2 is a flowchart of an example method for classifying devices based on user activity.

As described above, household devices may be associated with user profiles based on user activity. FIG. 2 is a flow chart of a method 200 for determining a profile for devices, such as devices 102a, 102b, based on user activity. The method 200 may be performed, for example, by the gateway 104. If a device belongs to a profile, the profile may indicate a user of the device, such as a primary and/or secondary user of the device. More than one device in a household may belong to the same profile. If more than one device belongs to a single profile, those devices may share a user, such as a primary and/or secondary user. If more than one device belongs to a single profile, one device may be a primary device while another device may be a secondary device. Each device in the plurality may be, for example, an Internet access device.

The method 200 may be used to determine a profile for devices based on those devices' user activity. The user activity of a device may indicate when the device is being used by a member of a household and/or how the household member is using the device during that time. For example, the user activity of a device may indicate when the household member is using the device is to connect to the Internet. To determine the user activity of a device, online activity variables may be collected for that device. For example, online activity variables may be based off of telemetry data that is automatically collected for that device at a gateway device.

Each device's user activity may be represented as an activity model. The activity model for a particular device may be generated based on one or more of the collected online activity variables and may be representative of that device's usage patterns over time. For example, the activity model may be a time series model. A device's activity model may be used to determine a profile for that device. To determine a profile for a device, the device's activity model may be compared to activity models of other devices in the household. By comparing a device's activity model to the activity models of other devices in the household, it may be determined if the user activity of that device is similar to the user activity of any of the other devices in the household. If the user activity of the device is similar to the user activity of one or more other devices in the household, this may indicate that all of these devices share a primary user and should therefore belong in the same profile. For example, if two devices are frequently connected to the internet at the same time, this may indicate that these two devices share a primary user and should therefore be classified in the same profile.

The user activity of a device may be represented by online activity variables. The online activity variables may indicate when the device is being used by a member of a household and/or how the household member is using the device during that time. In step 202, at least one online activity variable with respect to time associated with a plurality of devices may be received. The at least one online activity variable with respect to time may be received at a gateway, such as gateway 104. The at least one online activity variable may be received at sample time points, such as at every 15 minutes. The sample time points may occur for a set time period, such as for two weeks. For example, the at least one online activity variables may be collected, by a gateway device, every 15 minutes for two weeks.

The online activity variables may indicate when each of the plurality of devices are being used by a member of a household and/or how the household member is using the device during that time. The online activity variables may be based off of telemetry data that is automatically collected for that device at a gateway device. Telemetry data for a device may include, for example, at least one of the device's internet connectivity over time, an amount of information downloaded by the device in a recent time interval, an amount of information uploaded by the device in a recent time interval, a received signal strength indication (RSSI) over time, and/or any other online activity with respect to time. For example, the online activity variables associated with each device may include an amount of information downloaded or uploaded by the device within the past 15 minutes.

Figure 3:
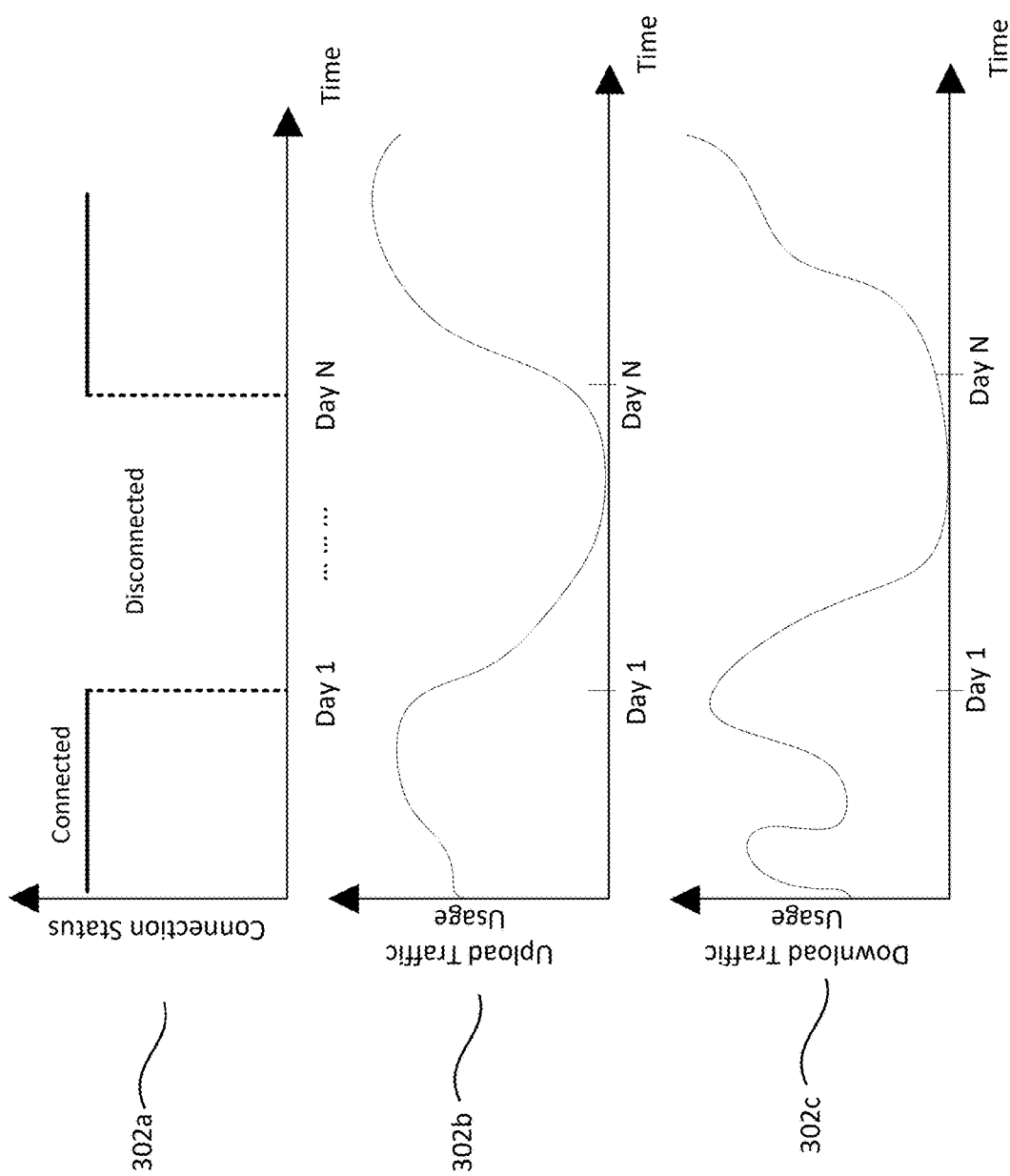
FIG. 3 is a set of example online activity variables.
Figure 4:
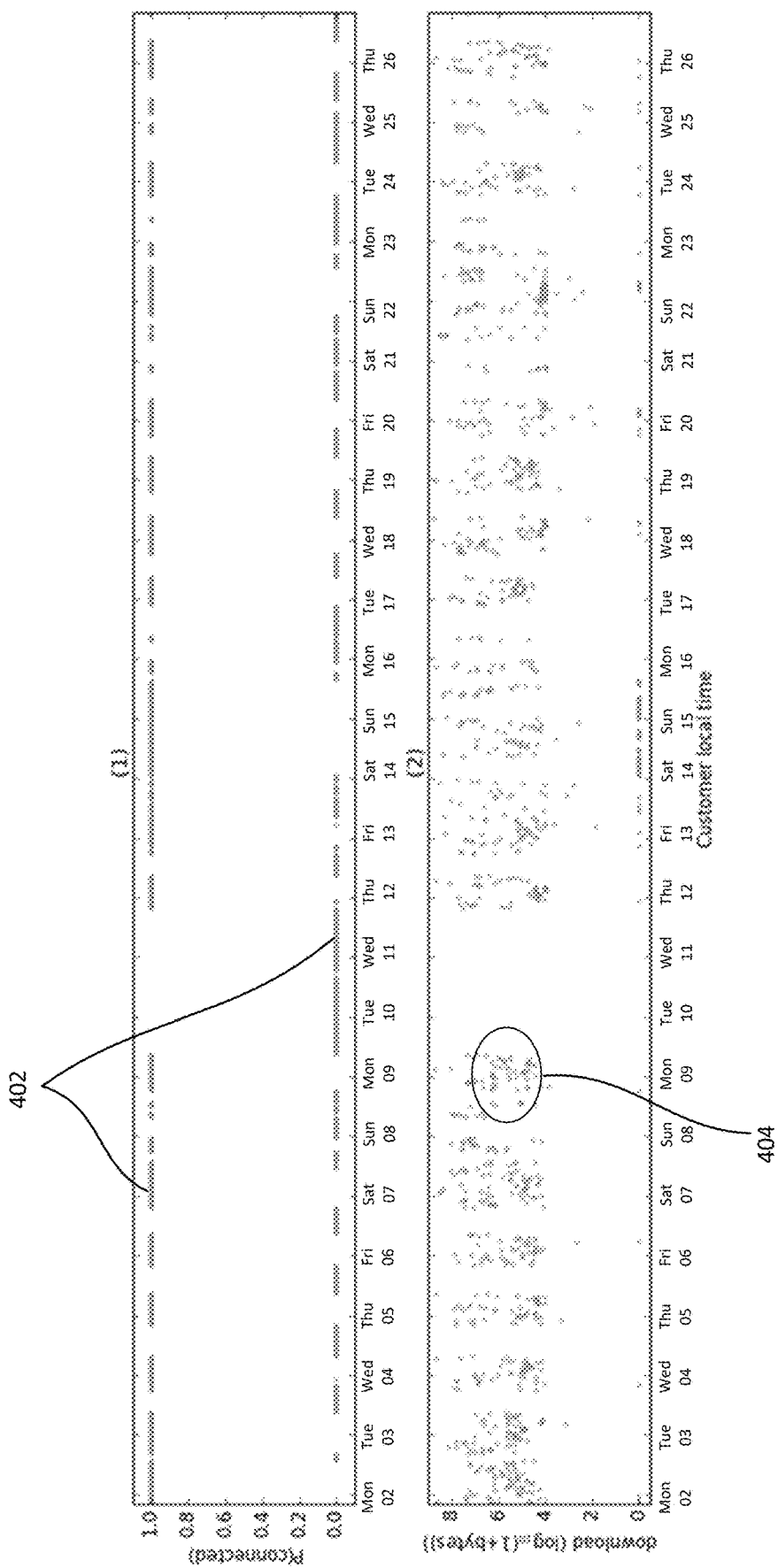
FIG. 4 is a set of example online activity variables.

FIGS. 3-4 illustrate exemplary online activity variables with respect to time. As described above, an online activity variable with respect to time may indicate an active connection status with respect to time, such as an internet connection status with respect to time 302*a*, 402. The active connection status with respect to time may indicate, for example, when the at least one device is connected to the Internet. The active connection status with respect to time may similarly indicate when the at least one device is or is not connected to the Internet. For example, referring to 302*a*, the device associated with this online activity variable was connected to the Internet during the time periods indicated by a solid line, and was disconnected from the Internet during the time period indicated between the solid lines.

As also described above, an online activity variable with respect to time may indicate an upload volume or a download volume with respect to time, such as an upload traffic usage with respect to time 302*b* or a download traffic usage with respect to time 302*c*, 404. The upload volume with respect to time may indicate a volume of bytes that the at least one device is uploading to the Internet. The download volume with respect to time may indicate a volume of bytes that the at least one device is downloading from the Internet.

The online activity variables for a device may be used to generate an activity model for the device. In step 204, an activity model may be determined for each of the devices of the plurality of devices. The activity model for each device may be generated based on one or more of the collected online activity variables and may be representative of that device's usage patterns over time. For example, the activity model may be a time series model. If online activity variables were collected for a particular time period, such as for two weeks, the activity model may represent the overall online activity of the device for that two-week period.

The activity model for each device may be generated based on more than one collected online activity variable. For example, if the collected online activity variables for a device include when that device is or is not connected to the internet, how much information that device is uploading and/or downloading, or a received signal strength indication (RSSI) of the device, the activity model for the device may be based on more than one of these variables. For example, the activity model for each device may include four dimensions, such as internet connectivity, bytes downloaded, bytes uploaded, and RSSI, with values for each dimension taken every 15 minutes for a period, such as a period of two weeks.

Figure 5:
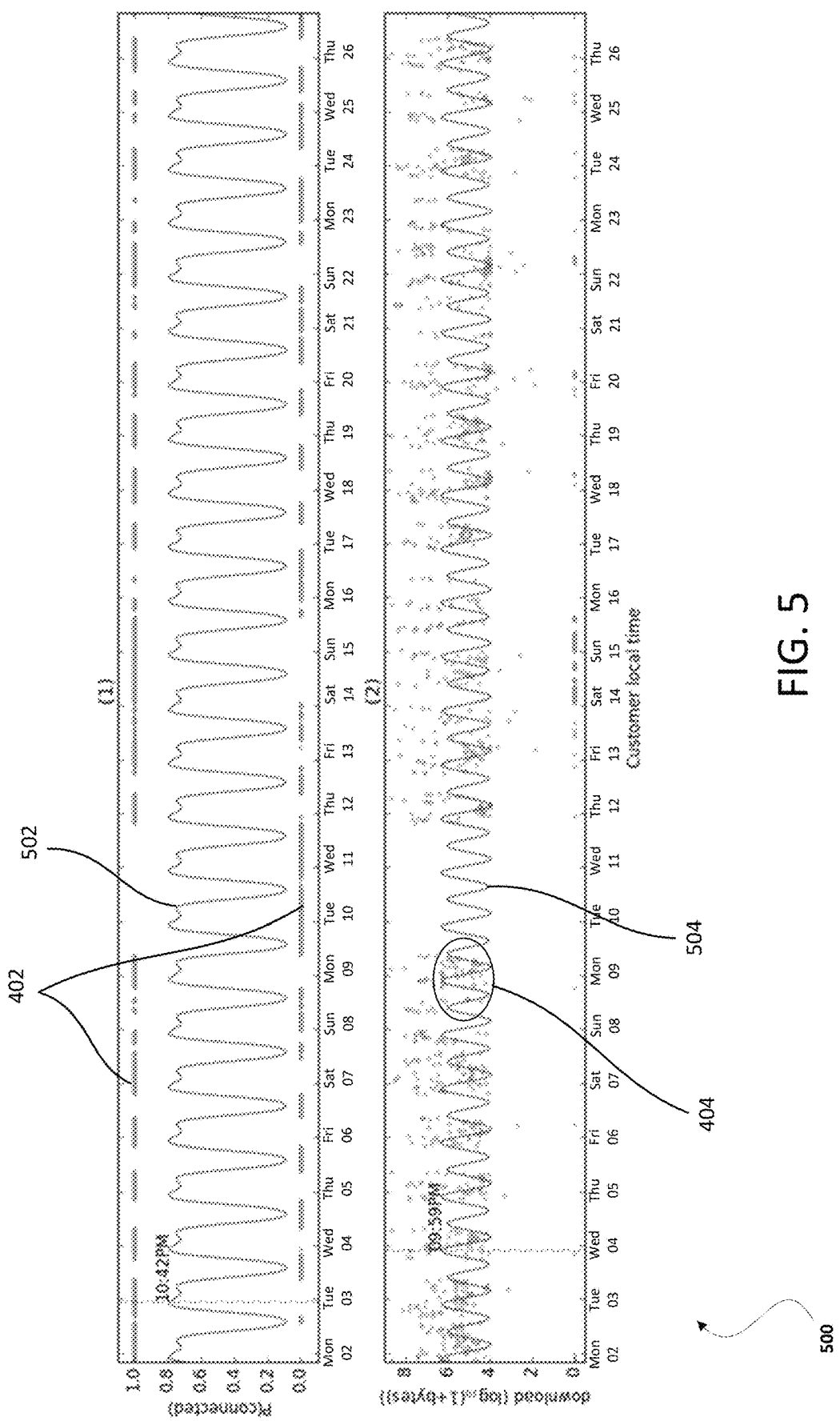
FIG. 5 is an example activity model for a device.

Determining the activity model for each of the devices may comprise fitting the at least one online activity variable with respect to time to a regression model or a machine learning model. The regression model may be fitted to the online activity data using linear regression. For example, the regression model may comprise a linear combination of sine waves and cosine waves. FIG. 5 illustrates an exemplary activity model 500 for a device. The activity model 500 may comprise a regression model 502, 504 fitted to online activity variables with respect to time, such as the online activity variables with respect to time 402, 404 of FIG. 4. If the classifier is a machine learning model, non-linear and neural network models may be used. The machine learning model may be trained to use past data from households that already created profiles for the household devices. This past data may include examples of pairs of devices that are in the same profile and examples of pairs of devices that are in the same household but in different profiles. The examples of pairs of devices that are in the same profile may be used as positive training data for the machine learning model. The examples of pairs of devices that are in the same household but in different profiles may be used as negative training data for the machine learning model.

The activity model may be used to determine time periods during which usage for the device is high. For example, if the activity model comprises a linear combination of sine waves and cosine waves, the activity model may comprise "peaks" and "troughs." The time periods during which usage for the device is high may be indicated by a "peak" in the activity model. In step 206, high usage times associated with each of the devices of the plurality of devices may be determined. The high usage times associated with each of the devices may include the time periods during which that device is most heavily used, such as those time periods during which the device is most commonly connected to a gateway device and/or the internet or those time periods during which the device is uploading and/or downloading the most information.

The activity model may additionally, or alternatively, be used to determine time periods during which usage for the device is low and/or nonexistent (e.g. the device is not being used). For example, if the activity model comprises a linear combination of sine waves and cosine waves, the activity model may comprise "peaks" and "troughs." The time periods during which usage for the device is low and/or nonexistent may be indicated by a "trough" in the activity model. In step 206, low usage times associated with each of the devices of the plurality of devices may additionally, or alternatively, be determined. The low usage times associated with each of the devices may include the time periods during which that device is least heavily used and/or not used at all, such as those time periods during which the device is not connected to a gateway device.

Determining the usage times associated with each of the devices may comprise extracting magnitude and time parameters from the activity model. Usage times having a magnitude greater than a threshold may be determined to exclude, for example, background activity by each of the devices. The usage times for a device may indicate time periods that the device is most and/or least frequently used. For example, the usage times may indicate time periods that the device is or is not connected to the Internet, time periods the at least one device is uploading or downloading information to or from the Internet, or time periods that the at least one device receives the strongest signal.

The determined usage times of each of the devices may be used to determine a profile for one or more devices of the plurality of devices. If the determined usage times, extracted from the activity models, of two devices of the plurality of devices are similar, this may indicate that two devices share a user (e.g. a primary user and/or a secondary user) and therefore belong to same profile. For example, if two devices of the plurality of devices have similar usage times, this may indicate that the two devices are commonly connected to the Internet at the same time. If two devices are commonly connected to the Internet at the same time, this may indicate that the two devices belong to the same member of the household and should therefore both belong to the profile associated with that member of the household.

In step 208, a probability of at least two devices of the plurality of devices belonging to the same profile may be determined. The profile may be associated with a first user, such as a first member of a household. The probability may be determined by comparing the usage times of the at least two devices. The at least two devices may belong to the same profile if the device is primarily used by the first member of the household. The probability of the at least two devices belonging to the same profile may be determined using the access times associated with the at least two devices. For example, determining the probability may comprise comparing the access times associated with the at least two devices.

The probability of the at least two devices belonging to the same profile may be determined by a classifier. The classifier may output a probability of the at least two devices belonging to the same profile, based on a comparison of the usage times of the at least two devices. In addition to comparing the usage times of the at least two devices, the classifier may use other device information, such as information about the device-type of the at least two devices, to determine the probability that the at least two devices belong to the same user. The device-type of each of the devices may be, for example, a phone, a laptop, a smart watch, a gaming device, a tablet, a thermostat, or any other type of device.

The device-type information may be used by the classifier in a number of ways. For example, if two devices are the same type of device, this may make it less likely that the two devices belong to the same user. For example, if the two devices are both laptops, this may indicate that the two devices are less likely to belong to the same user because a single household member is not likely to own two laptops. Additionally, or alternatively, the classifier may use the device-type information to determine the likelihood that a particular device is a shared or a core device. A shared device is a device that is used by more than one member of the household, whereas a core device is a device used by a single user and is not shared amongst different users in the household. Different types of devices may be more likely to be shared devices than other types of devices. For example, a tablet is more likely to be used by multiple members of a household than a phone is. The phone may be more likely to be a core device than the tablet is.

The probability may be compared to a threshold. For example, the classifier may compare the probability to a threshold. If the probability satisfies a threshold, this may indicate that the at least two devices have the same user, and therefore that the at least two device belongs to the same profile. If the probability satisfies the threshold, the method 200 may proceed to step 210. The probability may satisfy the threshold if the usage times of the at least two devices are similar to each other. If the usage times of the at least two devices are similar to each other, this may indicate that the at least two devices have the same primary user.

As described above, the threshold may be different for different types of devices. For example, certain types of devices are more likely to be shared devices, and other types of devices are more likely to be core devices. For devices that are more likely to be shared, such as a tablet, a desktop computer, or an Xbox, the probability of these devices belonging to the first profile may have to satisfy a higher threshold in order to be classified in the first profile. For example, in order to be classified in the first profile, the activity models of these likely-shared devices may need to be more similar to the activity models of devices already classified in the first profile. Conversely, for devices that are less likely to be shared, such as a phone or a watch, the probability of these devices belonging to the first profile may only have to satisfy a lower threshold in order to be classified in the first profile. For example, in order to be classified in the first profile, the activity models of these not-likely-shared devices may need to have some similarity to the activity models of devices already classified in the first profile, but not as high a similarity as the likely-shared devices.

In step 210, it may be determined that the at least two devices belong to the same profile. Based on determining that the at least two devices belong to the same profile, a user, such as a primary user, of the at least two devices may easily be determined. For example, if it is known that the at least two devices belong to a first profile, then it is known that a user of the at least two devices is the household member associated with the first profile.

Conversely, If the probability does not satisfy a threshold, this may indicate that the at least two devices do not share a common user. If the at least two devices do not share a common user, the at least two devices may not belong to the same profile. If the probability does not satisfy the threshold, the method 200 may proceed to step 212. The probability may not satisfy the threshold if the usage times of the at least two devices are not similar to each other. If the usage times of the at least two devices are not similar to each other, this may indicate that the at least two devices do not have the same primary user.

In step 212, it may be determined that the at least two devices do not belong to the same profile. If it is determined that the at least two devices do not belong to the same profile, the at least two devices may each belong to a different profile. The different profiles may be associated with a different user, such as different members of the household.

Figure 6B:
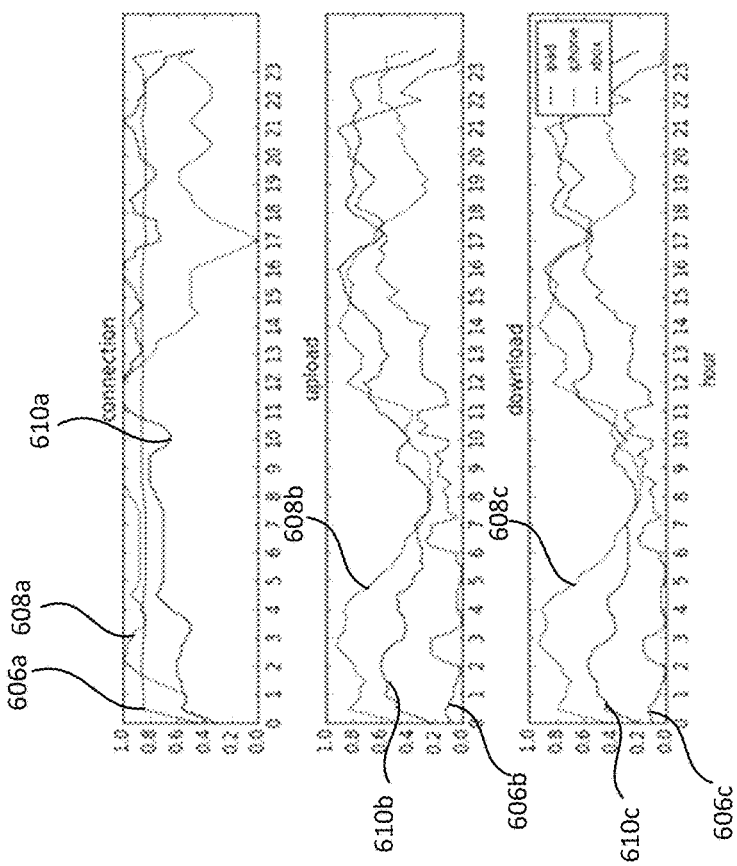
FIG. 6 is an example set of activity model comparisons for different devices.
Figure 6A:
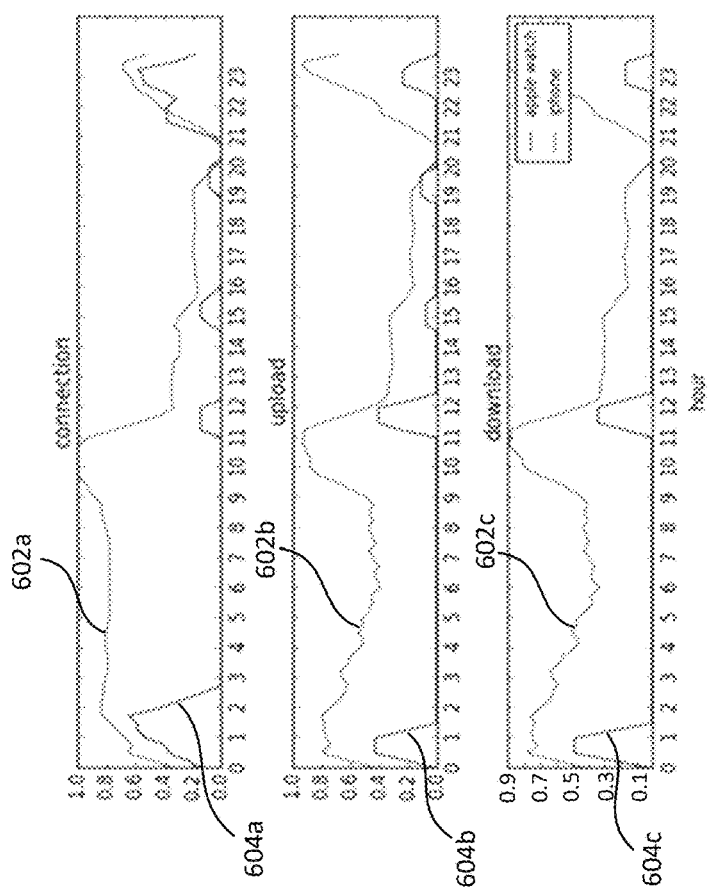

As discussed above, a device's activity model may be used to determine a profile for that device. To determine a profile for a device, the device's activity model may be compared to activity models of other devices in the household. By comparing a device's activity model to the activity models of other devices in the household, it may be determined if the user activity of that device is similar to the user activity of any of the other devices in the household. If the user activity of the device is similar to the user activity of one or more other devices in the household, this may indicate that all of these devices shared a user, such as a primary user, and therefore all belong to the same profile. FIGS. 6*a-b* illustrates two exemplary comparisons of activity models for different devices. The comparisons may be used, such as by a classifier, to determine if the devices whose activity models are being compared belong to the same profile.

Referring to FIG. 6a, two devices, such as an Apple watch and an iPhone, may each be associated with an activity model. For example, the Apple watch may be associated with activity model 602a-c and the iPhone may be associated with activity model 604a-c. The activity model 602a-c indicates three different online activity variables with respect to time for the Apple watch. For example, the portion 602a indicates a connectivity of the Apple watch over time, such as an internet connectivity. The portion 602b indicates an amount of information uploaded by the Apple watch over time, and the portion 602c indicates an amount of information downloaded by the Apple watch over time. Likewise, the activity model 604a-c indicates three different online activity variables with respect to time for the iPhone. For example, the portion 604a indicates a connectivity of the iPhone over time, such as an internet connectivity. The portion 604b indicates an amount of information uploaded by the iPhone over time, and the portion 604c indicates an amount of information downloaded by the iPhone over time.

The activity model 602a-c may be compared to the activity model 604a-c to determine if the Apple watch and the iPhone have similar user activity. The activity model 602a-c may have similar user activity to the activity model 604c if the usage times for the two devices are similar. For example, the activity model 602a-c may have similar user activity to the activity model 604c if the peaks and troughs depicted in the activity model 602a-c occur at similar times to the peaks and troughs depicted in the activity model 604a-c. If the Apple watch and the iPhone have similar user activity, the Apple watch and the iPhone may belong to the same profile, such as a first profile.

Referring now to FIG. 6b, three devices, such as an iPad, an iPhone, and an Xbox, may each be associated with an activity model. It may already have been determined that two of the three devices, such as the iPhone and Xbox, belong to the same profile, such as a second profile. The iPad may be associated with activity model 606a-c and the iPhone may be associated with activity model 608a-c. The activity model 606a-c indicates three different online activity variables with respect to time for the iPad. For example, the portion 606a indicates a connectivity of the iPad over time, such as an internet connectivity. The portion 606b indicates an amount of information uploaded by the iPad over time, and the portion 606c indicates an amount of information downloaded by the iPad over time. Likewise, the activity model 608a-c indicates three different online activity variables with respect to time for the iPhone. For example, the portion 608a indicates a connectivity of the iPhone over time, such as an internet connectivity. The portion 608b indicates an amount of information uploaded by the iPhone over time, and the portion 608c indicates an amount of information downloaded by the iPhone over time. Likewise, the activity model 610a-c indicates three different online activity variables with respect to time for the Xbox. For example, the portion 610a indicates a connectivity of the Xbox over time, such as an internet connectivity. The portion 610b indicates an amount of information uploaded by the Xbox over time, and the portion 610c indicates an amount of information downloaded by the Xbox over time.

The activity model 606a-c may be compared to the activity models 608a-c, 610a-c to determine if the iPad has similar user activity to the iPhone and Xbox. The activity model 606a-c may have similar user activity to the activity models 608a-c, 610a-c if the usage times for the devices are similar. For example, the activity model 606a-c may have similar user activity to the activity models 608a-c, 610a-c if the peaks and troughs depicted in the activity model 606a-c occur at similar times to the peaks and troughs depicted in the activity models 608a-c, 610a-c. If the iPad has similar user activity to the iPhone and Xbox, the iPad may belong to the same profile that the iPhone and Xbox belong to, such as the second profile. If the iPad does not have similar user activity to the iPhone and Xbox, the iPad may belong to a different profile than the iPhone and Xbox.

Figure 7:
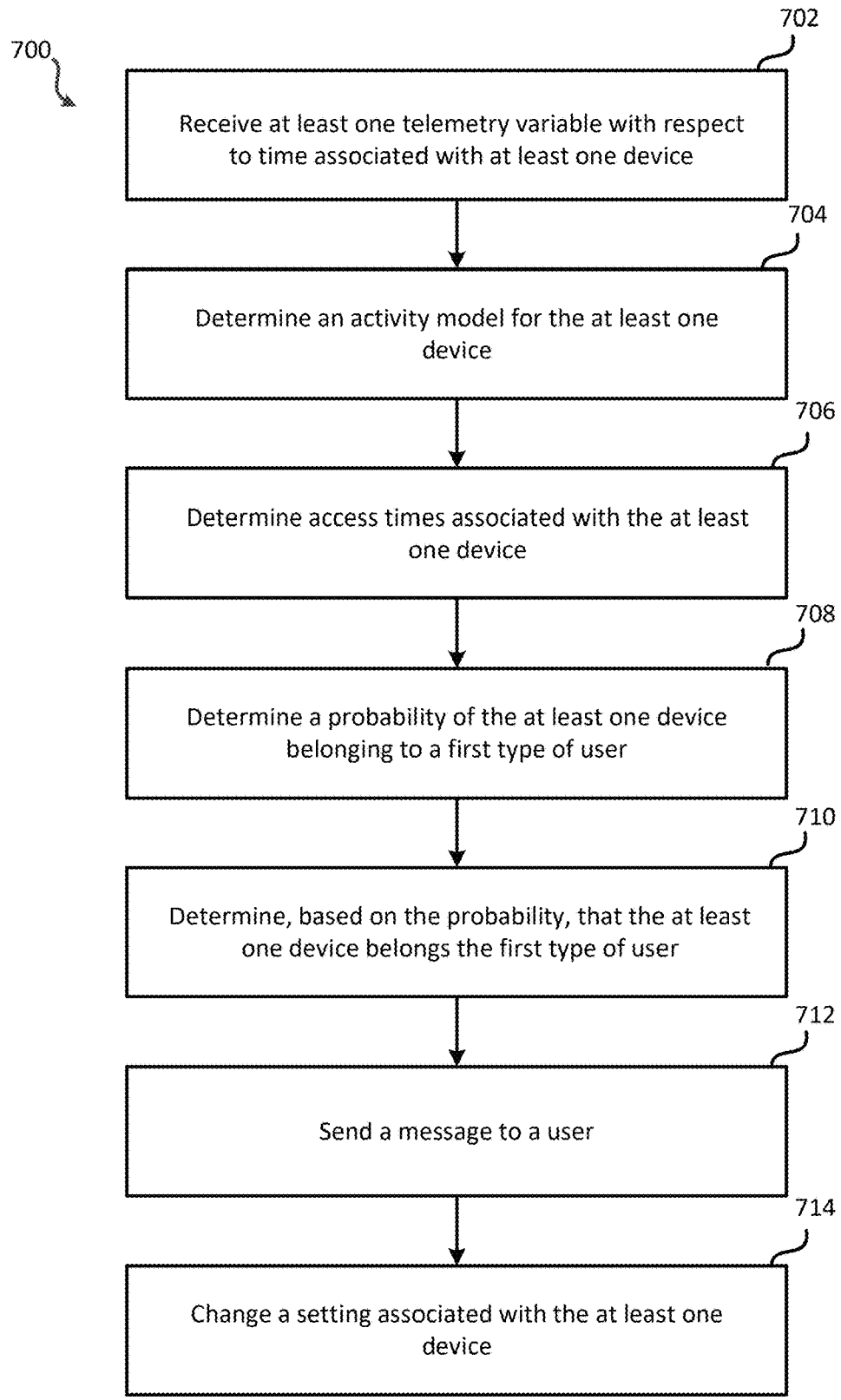
FIG. 7 is a flowchart of an example method for classifying devices based on user activity.

While method 200, described above, may be used to determine a profile for household devices based on user activity, user activity may additionally, or alternatively, be used to determine a type of user for household devices. FIG. 7 is a flow chart of an example method 700 for classifying devices, such as devices 102a, 102b, based on user activity. The method 700 may be performed, for example, by the gateway 104. The method 700 may be used to determine a type of user for household devices, such as Internet access devices, based on user activity. The type of user for a device may indicate demographic information associated with a user, such as a primary user, of the device, such as whether that user is a child or an adult.

The user activity of a device may indicate when the device is being used by a member of a household and/or how the household member is using the device during that time. For example, the user activity of a device may indicate when the household member is using the device is to connect to the Internet. To determine the user activity of a device, online activity variables may be collected for that device. For example, online activity variables may be based off of telemetry data that is automatically collected for that device at a gateway device.

Each device's user activity may be represented as an activity model. The activity model for a particular device may be generated based on one or more of the collected online activity variables and may be representative of that device's usage patterns over time. For example, the activity model may be a time series model. The user activity of a device may be represented by online activity variables. The online activity variables may indicate when the device is being used by a member of a household and/or how the household member is using the device during that time. In step 702, at least one online activity variable with respect to time associated with at least one device may be received. The at least one online activity variable with respect to time may be received at a gateway, such as gateway 104. The at least one online activity variable may be received at sample time points, such as at every 15 minutes. The sample time points may occur for a set time period, such as for two weeks. For example, the at least one online activity variables may be collected, by a gateway device, every 15 minutes for two weeks.

The online activity variables may indicate when the device is being used by a member of a household and/or how the household member is using the device during that time. The online activity variables may be based off of telemetry data that is automatically collected for that device at a gateway device. Telemetry data may include, for example, at least one of the device's internet connectivity over time, an amount of information downloaded by the device in a recent time interval, an amount of information uploaded by the device in a recent time interval, a received signal strength indication (RSSI) over time, and/or any other online activity with respect to time. For example, the online activity variables associated with each device may include an amount of information downloaded or uploaded by the device within the past 15 minutes.

Referring back to FIGS. 3-4, exemplary online activity variables with respect to time are illustrated. As described above, an online activity variable with respect to time may indicate an active connection status with respect to time, such as an internet connection status with respect to time 302a, 402. The active connection status with respect to time may indicate, for example, when the at least one device is connected to the Internet. The active connection status with respect to time may similarly indicate when the at least one device is not connected to the Internet. For example, referring to 302a, the device associated with this online activity variable was connected to the Internet during the time periods indicated by a solid line, and was disconnected from the Internet during the time period indicated between the solid lines. As also described above, an online activity variable with respect to time may indicate an upload volume or a download volume with respect to time, such as an upload traffic usage with respect to time 302b or a download traffic usage with respect to time 302c, 404. The upload volume with respect to time may indicate a volume of bytes that the at least one device is uploading to the Internet. The download volume with respect to time may indicate a volume of bytes that the at least one device is downloading from the Internet.

The online activity variables for a device may be used to generate an activity model for the device. In step 704, an activity model may be determined for the at least one device. The activity model for the at least one device may be generated based on one or more of the collected online activity variables and may be representative of that device's usage patterns over time. For example, the activity model may be a time series model. If online activity variables were collected for a particular time period, such as for two weeks, the activity model may represent the overall online activity of the device for that two-week period.

The activity model may be generated based on more than one collected online activity variable. For example, if the collected online activity variables for a device include when that device is connected to the internet, how much information that device is uploading and/or downloading, or a received signal strength indication (RSSI) of the device, the activity model for the device may be based on more than one of these variables. For example, the activity model may include four dimensions, such as internet connectivity, bytes downloaded, bytes uploaded, and RSSI, with values for each dimension taken every 15 minutes for a period, such as a period of two weeks.

Determining the activity model for the at least one device may comprise fitting the at least one online activity variable with respect to time to a regression model or a machine learning model. The regression model may be fitted to the online activity data using linear regression. For example, the regression model may comprise a linear combination of sine waves and cosine waves. FIG. 5 illustrates an exemplary activity model 500 for a device. The activity model 500 may comprise a regression model 502, 504 fitted to online activity variables with respect to time, such as the online activity variables with respect to time 402, 404 of FIG. 4. If the classifier is a machine learning model, non-linear and neural network models may be used. The machine learning model may be trained to use past data from households that already created profiles for the household devices. This past data may include examples of pairs of devices that are in the same profile and examples of pairs of devices that are in the same household but in different profiles. The examples of pairs of devices that are in the same profile may be used as positive training data for the machine learning model. The examples of pairs of devices that are in the same household but in different profiles may be used as negative training data for the machine learning model.

The activity model may be used to determine time periods during which usage for the device is high. For example, if the activity model comprises a linear combination of sine waves and cosine waves, the activity model may comprise "peaks" and "troughs." The time periods during which usage for the device is high may be indicated by a "peak" in the activity model. In step 706, high usage times associated with the at least one device may be determined. The high usage times associated with the at least one device may include the time periods during which the device is most heavily used, such as those time periods during which the device is most commonly connected to the internet or those time periods during which the device is uploading and/or downloading the most information.

Determining the usage times associated with the at least one device may comprise extracting magnitude and time parameters from the activity model. Usage times having a magnitude greater than a threshold may be determined to exclude, for example, background activity by the at least one device. The usage times may indicate time periods that the at least one device is most frequently used. For example, the usage times may indicate time periods that the at least one device is connected to the Internet, time periods the at least one device is uploading or downloading information to or from the Internet, or time periods that the at least one device receives the strongest signal.

The determined usage times of the at least one device may be used to determine a type of user for the device. In step 708, a probability of the at least one device being associated with a first type of user may be determined. The first type of user may indicate any demographic of the household members. For example, the first type of user may be a child. Alternatively, the first type of user may be an adult.

Determining the probability may comprise determining time periods, based on the activity model, that the at least one device is most frequently used. For example, determining the probability may comprise determining, based on the access times, time periods that the at least one device is most frequently used. The probability may be determined by comparing the determined usage times of the at least one device to usage patterns associated with different types of users, such as usage patterns commonly associated with children or adults. For example, a child is less likely to be using a household device during the mornings or afternoons during the school year. A child may also be less likely to be using a device during late evening hours, such as after 10p.m. Conversely, an adult may be more likely to be using a household device during the mornings of afternoons during the school year, or during late evening hours.

The usage patterns commonly associated with different types of users may be based on historical data or based on predefined metrics. For example, the usage patterns commonly associated with a child may be based on historical school year hours. The historical school year hours may indicate which days, months, or hours children are typically in school. The usage patterns commonly associated with an adult may be based on historical business/work hours. The historical business/work hours may indicate which days, months, or hours an adult may typically be at their place of work, rather than at home.

The probability of the at least one device belonging to the first type of user may be determined by a classifier. The classifier may output a probability of the at least one device belonging to the first type of user, based on a comparison of the usage times of the at least one device and usage patterns commonly associated with the first type of user. In addition to comparing the usage times of the at least one device and the usage patterns commonly associated with the first type of user, the classifier may use other device information, such as information about the device-type of the at least one device, to determine the probability that the device belong to the first type of user. The device-type of the at least one device may be, for example, a phone, a laptop, a smart watch, a gaming device, a tablet, a thermostat, or any other type of device. For example, if the at least one device is an Xbox, this may indicate that the device is more likely to belong to a child. Similarly, if the at least one device is a laptop, this may indicate the device is less likely to belong to a child.

The probability may be compared to a threshold. For example, the classifier may compare the probability to a threshold. If the probability satisfies a threshold, this may indicate that the user of the at least one device is the first type of user. If the probability satisfies the threshold, the method 700 may proceed to step 710. Conversely, if the probability does not satisfy the threshold, this may indicate that the primary user of the at least one device is not the first type of user. If the probability does not satisfy the threshold, the at least one device may belong to a different, second type of user. In step 710, it may be determined that the at least one device belongs to the first type of user. Determining that the at least one device belongs to the first type of user may, for example, indicate that the at least one device is primarily used by a child. Alternatively, determining that the at least one device belongs to the first type of user may indicate that the at least one device is primarily used by an adult. As discussed above, the "type of user" classification for the device may be stored and used to control various aspects of the device. For example, based on the type of user for a device, a setting for the device may be automatically changed or a household member may be prompted to change a setting for the device.

In step 712, a message may be sent to a user. The message may be sent to the user based on determining that the at least one device belongs to the first type of user. For example, the user may be a member of a household, such as a head of the household. The user may be the same type of user or a different type of user as the first type of user. For example, if the first type of user is a child, the message may be sent to the head of household, which may be an adult. The message may comprise a recommendation to change a setting. If the first type of user is a child, the message may comprise a parental control recommendation. In step 714, a setting associated with the at least one device may be changed. The setting may be changed based on determining that the at least one device belongs to the first type of user. The setting may be a restriction on access to content, such as Internet content. For example, the setting may be a parental control setting. If the at least one device belongs to a profile, such as the profiles 600*a*, 600*b*, the setting, such as the parental control setting, may be changed for every device in the profile.

Figure 8:
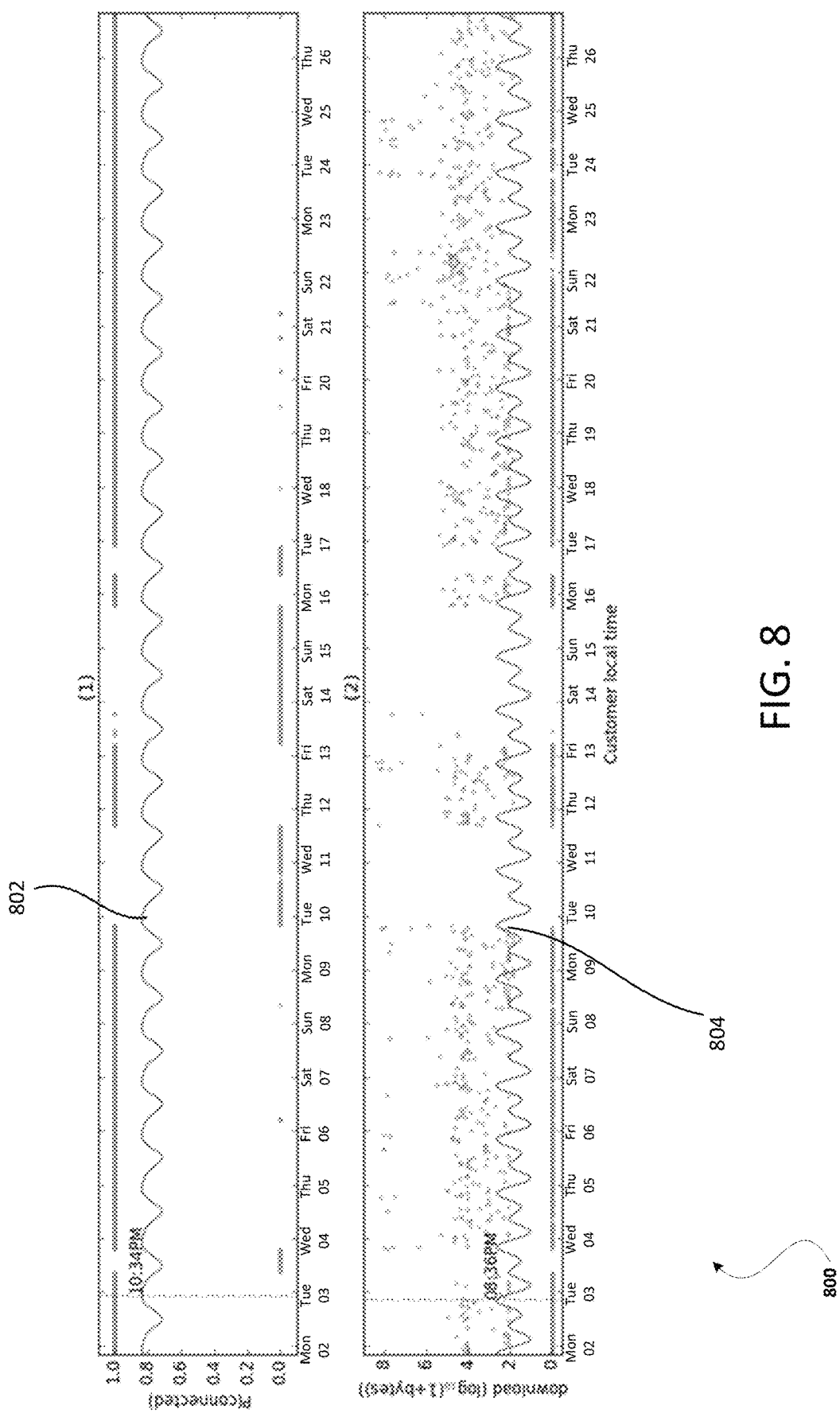
FIG. 8 is an example activity model for a device.

As described above, the online activity variables for a device may be used to generate an activity model for the device. The activity model for the device may be generated based on one or more of the collected online activity variables and may be representative of that device's usage patterns over time. For example, the activity model may be a time series model. If online activity variables were collected for a particular time period, such as for two weeks, the activity model may represent the overall online activity of the device for that two-week period. FIG. 8 illustrates an exemplary activity model 800 for a device. The activity model 800 may comprise a regression model 802, 804 fitted to the at least one online activity variable with respect to time.

The activity model may be generated based on more than one collected online activity variable. For example, if the collected online activity variables for a device include when that device is connected to the internet, how much information that device is uploading and/or downloading, or a received signal strength indication (RSSI) of the device, the activity model for the device may be based on more than one of these variables. For example, the activity model may include four dimensions, such as internet connectivity, bytes downloaded, bytes uploaded, and RSSI, with values for each dimension taken every 15 minutes for a period, such as a period of two weeks.

Determining the activity model for the at least one device may comprise fitting the at least one online activity variable with respect to time to a regression model or a machine learning model. The regression model may be fitted to the online activity data using linear regression. For example, the regression model may comprise a linear combination of sine waves and cosine waves. The activity model 800 may comprise a regression model 802, 804 fitted to the at least one online activity variable with respect to time. If the classifier is a machine learning model, non-linear and neural network models may be used. The machine learning model may be trained to use past data from households that already created profiles for the household devices. This past data may include examples of pairs of devices that are in the same profile and examples of pairs of devices that are in the same household but in different profiles. The examples of pairs of devices that are in the same profile may be used as positive training data for the machine learning model. The examples of pairs of devices that are in the same household but in different profiles may be used as negative training data for the machine learning model.

The activity model may be used to determine time periods during which usage for the device is high. For example, if the activity model comprises a linear combination of sine waves and cosine waves, the activity model may comprise "peaks" and "troughs." The time periods during which usage for the device is high may be indicated by a "peak" in the activity model. Based on the activity model, high usage times associated with the device may be determined. The high usage times associated with the device may include the time periods during which the device is most heavily used, such as those time periods during which the device is most commonly connected to the internet or those time periods during which the device is uploading and/or downloading the most information.

Determining the usage times associated with the at least one device may comprise extracting magnitude and time parameters from the activity model. Usage times having a magnitude greater than a threshold may be determined to exclude, for example, background activity by the at least one device. The usage times may indicate time periods that the at least one device is most frequently used. For example, the usage times may indicate time periods that the at least one device is connected to the Internet, time periods the at least one device is uploading or downloading information to or from the Internet, or time periods that the at least one device receives the strongest signal. The determined usage times of the at least one device may be used to a determine a probability of the device belonging to a particular type of user and/or to a particular profile.

Figure 9:
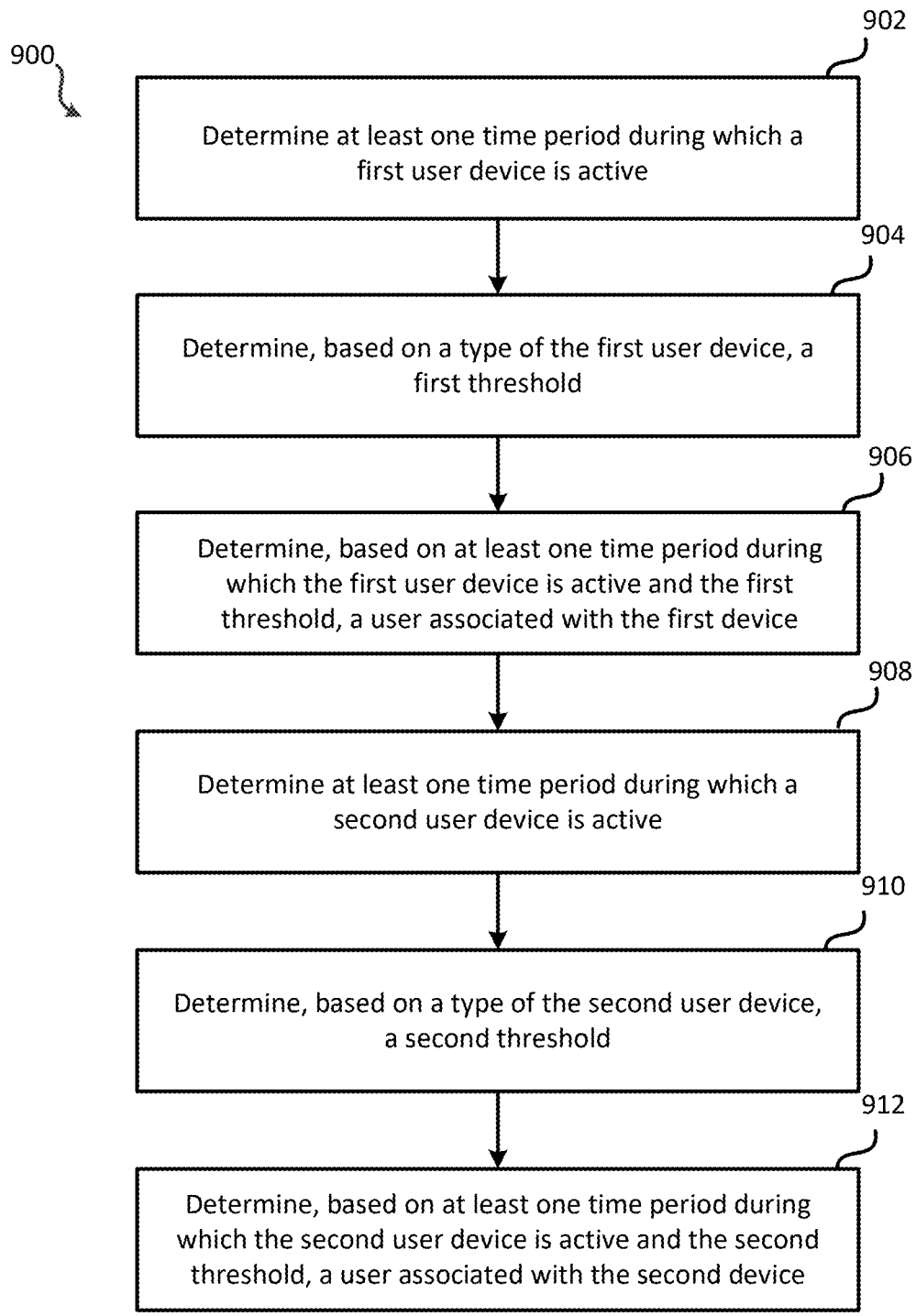
FIG. 9 is an example method for classifying devices based on device type.

FIG. 9 depicts a flow chart of an example method 900 for classifying devices, such as devices 102*a*, 102 based on user activity. As described above, the level of similarity between two device's activity models may indicate whether the two devices are both core devices used solely by a single household user, or if at least one of the two devices is a shared device. For example, the more similar the two activity models are, the more likely that the two devices are core devices belonging to the same user. Conversely, if the two activity models share some similarities but also share some noticeable difference, at least one of the two devices may be a shared device.

Certain types of devices are more likely to be shared devices, and other types of devices are more likely to be core devices. For devices that are more likely to be shared, such as a tablet, a desktop computer, or an Xbox, the probability of these devices belonging to a particular user may have to satisfy a higher threshold in order to determine that they are associated with that user's profile. For example, to determine that these devices are associated with a user's profile, the activity models of these likely-shared devices may need to be more similar to the activity models of devices already associated with that particular user's profile. Conversely, for devices that are less likely to be shared, such as a phone or a smart watch, the probability of these devices belonging to a particular user may only have to satisfy a lower threshold in order to determine that they are associated with that user's profile. For example, to determine that these devices are associated with a user's profile, the activity models of these not-likely-shared devices may need to have some similarity to the activity models of devices already associated with that particular user's profile, but not as high a similarity as the likely-shared devices. The method 900 may be used to determine whether a user device belongs to a user, based on a type of the user device.

As also described above, an activity model for a device may be generated based on more than one collected online activity variable. For example, if the collected online activity variables for a device include when that device is connected to the internet, how much information that device is uploading and/or downloading, or a received signal strength indication (RSSI) of the device, the activity model for the device may be based on more than one of these variables. For example, the activity model may include four dimensions, such as internet connectivity, bytes downloaded, bytes uploaded, and RSSI, with values for each dimension taken every 15 minutes for a period, such as a period of two weeks.

Determining the activity model for the device may comprise fitting the at least one online activity variable with respect to time to a regression model or a machine learning model. The regression model may be fitted to the online activity data using linear regression. For example, the regression model may comprise a linear combination of sine waves and cosine waves. The activity model may be used to determine time periods during which usage for the device is high. For example, if the activity model comprises a linear combination of sine waves and cosine waves, the activity model may comprise "peaks" and "troughs." At 902, at least one time period during which a device is active may be determined. The at least one time period during which the device is active may comprise at least one time period during which usage for the device is high. Time periods during which usage for the user device is high may be indicated by "peaks" in the activity model. Based on the activity model, high usage times associated with the device may be determined. The high usage times associated with the user device may include the time periods during which the device is most heavily used, such as those time periods during which the device is most commonly connected to the internet or those time periods during which the device is uploading and/or downloading the most information.

Determining the usage times associated with the device may comprise extracting magnitude and time parameters from the activity model. Usage times having a magnitude greater than a threshold may be determined to exclude, for example, background activity by the device. The usage times may indicate time periods that the device is most frequently used. For example, the usage times may indicate time periods that the device is connected to the Internet, time periods the device is uploading or downloading information to or from the Internet, or time periods that the device receives the strongest signal.

A classifier may be used to determine whether two devices have a common user and should therefore be associated with the same profile. The classifier may output a probability of two devices belonging to the same user, based on a comparison of the activity models of these two devices. If the activity models of the two devices are similar, this may indicate that two devices share a user and should therefore be associated with the same profile. However, a single device may be associated with more than one profile. A single device may be associated with more than one profile if it is a shared device. Conversely, a single device may be associated with only one profile if is a core device.

Certain types of devices are more likely to be shared devices, and other types of devices are more likely to be core devices. For devices that are more likely to be shared, such as a tablet, a desktop computer, or an Xbox, the probability of these devices belonging to a particular user may have to satisfy a higher threshold in order to determine that they are associated with that user's profile. For example, to determine that these devices are associated with a user's profile, the activity models of these likely-shared devices may need to be more similar to the activity models of devices already associated with that particular user's profile. Conversely, for devices that are less likely to be shared, such as a phone or a smart watch, the probability of these devices belonging to a particular user may only have to satisfy a lower threshold in order to determine that they are associated with that user's profile. For example, to determine that these devices are associated with a user's profile, the activity models of these not-likely-shared devices may need to have some similarity to the activity models of devices already associated with that particular user's profile, but not as high a similarity as the likely-shared devices.

At 904, a first threshold may be determined. The first threshold may be determined, at least in part, on a type of the device. For example, if the device is a smart watch, such as an iWatch, it is of a type that is less likely to be shared amongst multiple members of a household. Accordingly, to determine that the device belongs to a particular user, the probability of the device belonging to a particular user may have to satisfy a lower threshold (as compared to a type of device that is more likely to be shared). If the probability of the device belonging to the user satisfies the first threshold, it may be determined that the device is used by the user. At 906, a user associated with the device may be determined. For example, it may be determined that the device belongs to the user. If the device is associated with the user, the device may belong to a profile associated with the user. The user may be a primary or secondary user of the device. Conversely, if the probability of the device belonging to the user does not satisfy the first threshold, it may be determined that the device is not used by the user. For example, it may be determined that the user is not a primary or secondary user of the device.

For devices that are more likely to be shared, such as a tablet, a desktop computer, or an Xbox, the probability of these devices belonging to a particular user may have to satisfy a higher threshold in order to determine that they are associated with that user's profile. At 908, at least one time period during which a second user device is active may be determined. The at least one time period during which the second user device is active may be determined in a manner similar to how the at least one time period during which the first user device is active may be determined, as described above.

At 910, a second threshold may be determined, based on a type of the second user device. For example, if the second device is tablet, a desktop computer, or an Xbox, it is of a type that is more likely to be shared amongst multiple members of a household. Accordingly, to determine that the second device belongs to a particular user, the probability of the second device belonging to a particular user may have to satisfy a higher threshold than the first threshold. If the probability of the second device belonging to the user satisfies the second, higher threshold, it may be determined that the second device is used by the user. At 912, a user associated with the second device may be determined. For example, it may be determined that the second device belongs to the user. If the second device is associated with the user, the second device may belong to a profile associated with the user. The user may be a primary or secondary user of the second device. Conversely, if the probability of the second device belonging to the user does not satisfy the second threshold, it may be determined that the second device is not used by the user. For example, it may be determined that the user is not a primary or secondary user of the second device.

Figure 10:
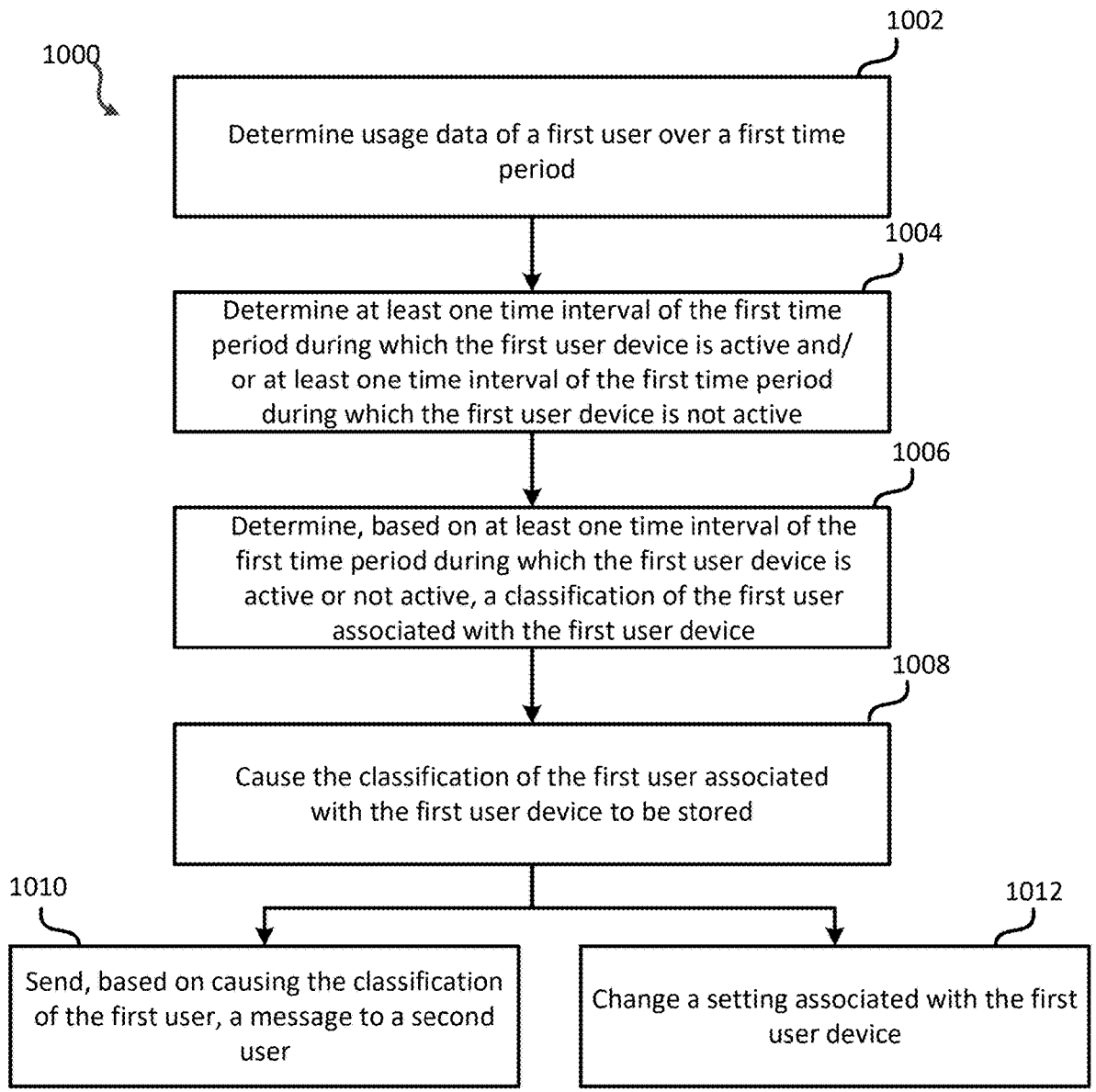
FIG. 10 is a flowchart of an example method for classifying devices based on user activity.

FIG. 10 depicts a flow chart of an example method 1000 for classifying devices, such as devices 102*a*, 102*b*, based on user activity. The method 1000 may be performed, for example, by the gateway 104. The method 1000 may be used to classify devices, such as Internet access devices, into "types of users" based on user activity. If a device is classified in a "type of user," the "type of user," may indicate demographic information associated with a primary user of the device, such as whether that user is a child or an adult.

The user activity of a device may indicate when the device is being used by a member of a household and/or how the household member is using the device during that time. For example, the user activity of a device may indicate when the household member is using the device is to connect to the Internet. To determine the user activity of a device, online activity variables may be collected for that device. For example, online activity variables may be based off of telemetry data that is automatically collected for that device at a gateway device.

Each device's user activity may be represented as an activity model. The activity model for a particular device may be generated based on one or more of the collected online activity variables and may be representative of that device's usage patterns over time. For example, the activity model may be a time series model. A device's activity model may be used to classify that device into a profile. To classify a device into a profile, the device's activity model may be compared to activity models of other devices in the household. By comparing a device's activity model to the activity models of other devices in the household, it may be determined if the user activity of that device is similar to the user activity of any of the other devices in the household. If the user activity of the device is similar to the user activity of one or more other devices in the household, this may indicate that all of these devices share a primary user and should therefore be classified in the same profile. For example, if two devices are frequently connected to the internet at the same time, this may indicate that these two devices share a primary user and should therefore be classified in the same profile.

The user activity of a device may be represented by online activity variables. The online activity variables may indicate when the device is being used by a member of a household and/or how the household member is using the device during that time. In step 1002, usage data of a first user over a first time period may be determined. The usage data may include, for example, online activity variables with respect to time. The usage data may be received at a gateway, such as gateway 104. The usage data may be received at sample time points, such as at every 15 minutes. The sample time points may occur for a set time period, such as for two weeks. For example, the usage data may be collected, by a gateway device, every 15 minutes for two weeks.

The usage data may indicate when the device is being used by a member of a household and/or how the household member is using the device during that time. The usage data may be based off of telemetry data that is automatically collected for that device at a gateway device. Usage data may include, for example, at least one of the device's internet connectivity over time, an amount of information downloaded by the device in a recent time interval, an amount of information uploaded by the device in a recent time interval, a received signal strength indication (RSSI) over time, and/or any other online activity with respect to time. For example, the usage data associated with each device may include an amount of information downloaded or uploaded by the device within the past 15 minutes. The usage data may additionally, or alternatively, indicate when the device is not being used by a member of the household. For example, time periods when the device was not connected to the internet may indicate those time periods when the device was not used by a member of the household.

The usage data for a device may be used to generate an activity model for the device. The activity model may be used to determine time periods during which usage for the device is high and/or time periods during which usage for the device is low. For example, if the activity model comprises a linear combination of sine waves and cosine waves, the activity model may comprise "peaks" and "troughs." The time periods during which usage for the device is high may be indicated by a "peak" in the activity model. The time periods during which usage for the device is low and/or nonexistent may be indicated by a "trough" in the activity model.

In step 1004, at least one time interval of the first time period during which the first user is active and/or at least one time interval of the first time period during which the first user is not active may be determined. The interval of the first time period during which the first user is active may be during one or more of the time periods during which the device is most heavily used, such as those time periods during which the device is most commonly connected to the internet or those time periods during which the device is uploading and/or downloading the most information. The interval of the first time period during which the first user is not active may be during one or more of the time periods during which the device is least heavily used, such as those time periods during which the device is not connected to the internet or those time periods during which the device is not uploading and/or downloading information.

Determining the usage times associated with the at least one device may comprise extracting magnitude and time parameters from the activity model. Usage times having a magnitude greater than a threshold may be determined to exclude, for example, background activity by the at least one device. The usage times may indicate time periods that the at least one device is most or least frequently used. For example, the usage times may indicate time periods that the at least one device is connected to the Internet, time periods the at least one device is uploading or downloading information to or from the Internet, or time periods that the at least one device receives the strongest signal.

The determined usage times of the at least one device may be used to classify the user in a "type of user." In step 1006, a classification of the first user may be determined. For example, the classification of the first user may be determined based on at least one time interval of the first time period during which the first user is active or the at least one time interval of the first time period during which the first user is not active. Determining the classification of the first user may comprise determining that the first user belongs to a first "type of user." The first "type of user" may indicate any demographic of the household members. For example, the first "type of user" may be a child. Alternatively, the first "type of user" may be an adult.

Determining the classification of the first user may comprise determining a probability of the at least one device belonging to the first "type of user." Determining the probability may comprise comparing the determined usage and/or non-usage times of the at least one device to usage patterns associated with different types of users, such as usage patterns commonly associated with children or adults. For example, a child is less likely to be using a household device during the mornings or afternoons during the school year. A child may also be less likely to be using a device during late evening hours, such as after 10 p.m. Conversely, an adult may be more likely to be using a household device during the mornings of afternoons during the school year, or during late evening hours.

The usage patterns commonly associated with different types of users may be based on historical data or based on predefined metrics. For example, the usage patterns commonly associated with a child may be based on historical school year hours. The historical school year hours may indicate which days, months, or hours children are typically in school. The usage patterns commonly associated with an adult may be based on historical business/work hours. The historical business/work hours may indicate which days, months, or hours an adult may typically be at their place of work, rather than at home.

The probability of the at least one device belonging to the first "type of user" may be determined by a classifier. The classifier may output a probability of the at least one device belonging to the first "type of user," based on a comparison of the usage times and/or the non-usage times of the at least one device and usage patterns commonly associated with the first type of user. In addition to comparing the usage times and/or the non-usage times of the at least one device and the usage patterns commonly associated with the first type of user, the classifier may use other device information, such as information about the device-type of the at least one device, to determine the probability that the device belong to the first "type of user." The device-type of the at least one device may be, for example, a phone, a laptop, a smart watch, a gaming device, a tablet, a thermostat, or any other type of device. For example, if the at least one device is an Xbox, this may indicate that the device is more likely to belong to a "child" type of user. Similarly, if the at least one device is a laptop, this may indicate the device is less likely to belong to a "child" type of user.

The "type of user" classification for the device may be stored and used to control various aspects of the device. In step 1008, storage of the classification of the first user associated with the at least one user device may be caused. In step 1010, a message may be sent to a user. The message may be sent to the user based on storing the classification of the first user. For example, the user may be a member of a household, such as a head of the household. The user may be the same "type of user" or a different "type of user" as the first "type of user." For example, if the first "type of user" is a child, the message may be sent to the head of household, which may be an adult. The message may comprise a recommendation to change a setting. If classification in the first "type of user" indicates that the at least one device is primarily used by a child, the message may comprise a parental control recommendation.

Once stored, the "type of user" classification may be used to automatically change settings associated with the device, or to prompt manual setting changes associated with the device. In step 1012, a setting associated with the first user device may be changed. For example, based on a device's "type of user" classification, a setting for the device may be automatically changed. For example, if a device is classified as a "child" device, a parental control setting may be automatically turned on for the device. Additionally, or alternatively, a setting associated with the first user device may be changed based on the message sent to the user, such as the message sent to the head of household. The user that received the message may view the recommendation to change a setting, such as a parental control setting, then manually change that setting themselves.

Figure 11:
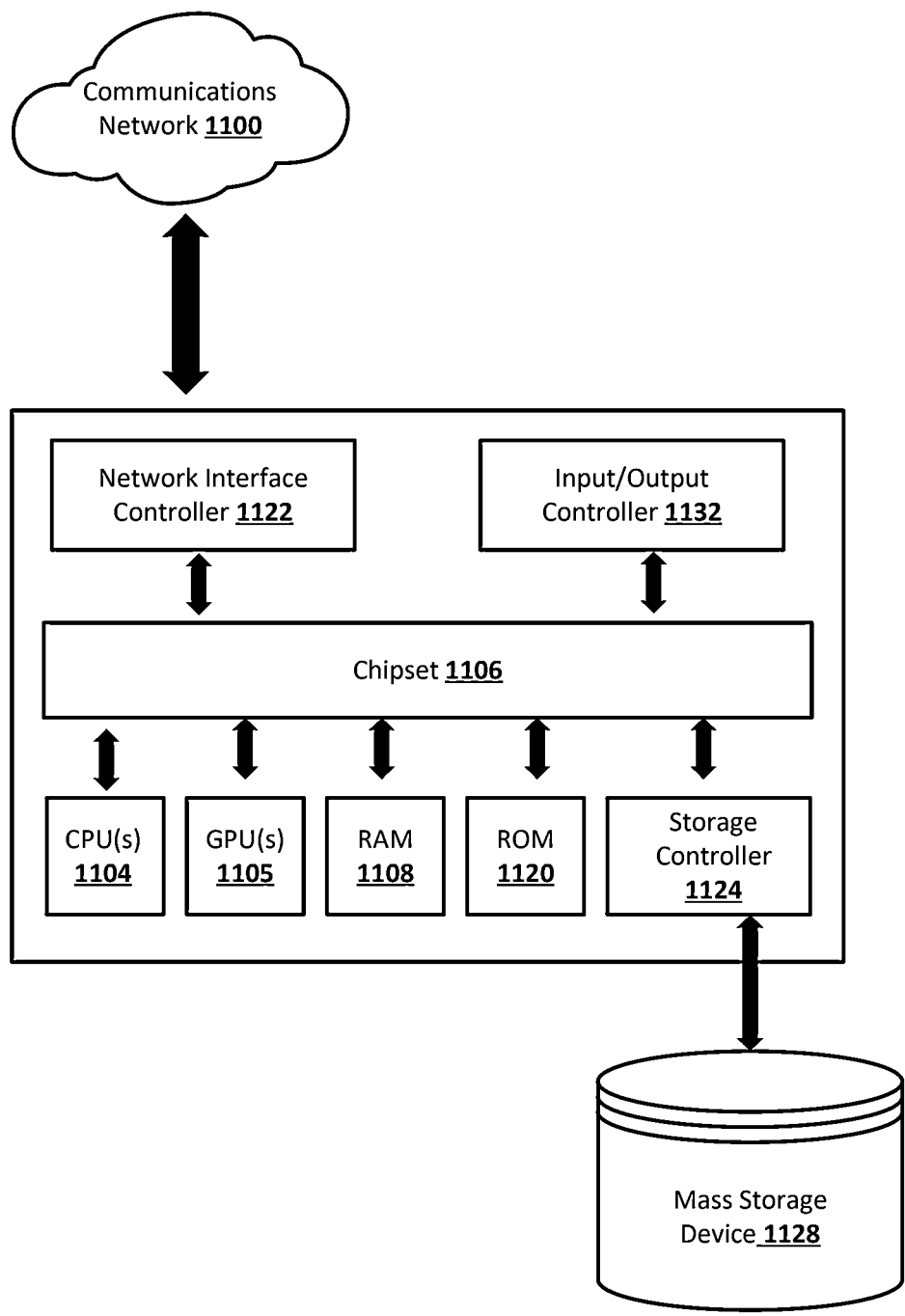
FIG. 11 is a block diagram of an example device.

FIG. 11 depicts an example computing device 1100 that may represent any of the various devices or entities illustrated in FIG. 1, including, for example, the devices 102*a*, 102*b*, the gateway 104, the hub 108, the server/router 110, and the edge router 112. That is, the computing device 1100 shown in FIG. 1 lmay be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIG. 1 or the methods described in relation to FIGS. 2, 7, 8, and 10.

The computing device 1100 may include a baseboard, or "motherboard," which is a printed circuit board to which a multitude of components or devices may be connected by way of a system bus or other electrical communication paths. One or more central processing units (CPUs or "processors") 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random access memory (RAM) 1108 used as the main memory in the computing device 1100. The chipset 1106 may provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems of the communications network 100. The chipset 1106 may include functionality for providing network connectivity through a network interface controller (NIC) 1122. A NIC 1122 may be capable of connecting the computing device 1100 to other computing nodes over the communications network 100. It should be appreciated that multiple NICs 1122 may be present in the computing device 1100, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the communications network 100. For example, the NIC 1122 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 1100 may be connected to a mass storage device 1128 that provides non-volatile storage (i.e., memory) for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on a mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may read information from the mass storage device 1128 by detecting the physical states or characteristics of one or more particular locations within the physical storage units.

In addition to the mass storage device 1128 described herein, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described herein. The computing device 1100 may have access to computer-readable storage media storing computer-executable instructions, which, when executed by the computing device 1100, may perform the methods described in relation to FIGS. 2, 7, 8, and 10.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   determining usage data of a user device over a time period;
   determining at least one time interval of the time period during which the user device is connected to a gateway device and at least one different time interval of the time period during which the user device is not connected to the gateway device;
   determining, based on the at least one time interval of the time period during which the user device is connected to the gateway device and the at least one different time interval of the time period during which the user device is not connected to the gateway device, a classification of a first user associated with the user device; and
   causing the classification of the first user associated with the user device to be stored.

2. The method of claim 1, further comprising sending, based on causing the classification of the first user associated with the user device to be stored, a message to a second user.

3. The method of claim 1, further comprising changing, based on causing the classification of the first user associated with the user device to be stored, a setting associated with the user device.

4. The method of claim 3, wherein changing the setting associated with the user device comprises changing a restriction on access to content.

5. The method of claim 1, wherein determining the usage data of the user device over the time period comprises collecting, at the gateway device, data indicative of online activity associated with the user device over the time period.

6. The method of claim 1, wherein determining the usage data of the user device over the time period comprises at least one of:
   determining an indication of an active connection of the user device with respect to time;
   determining an indication of an upload volume of the user device with respect to time;
   determining an indication of a download volume of the user device with respect to time; or
   determining an indication of a signal strength of the user device with respect to time.

7. The method of claim 1, wherein determining the at least one time interval of the time period during which the user device is connected to the gateway device comprises:
   fitting the usage data to a regression model; and
   extracting, from the regression model, magnitude and time parameters.

8. The method of claim 7, wherein determining, based on at the least one time interval of the time period during which the user device is connected to the gateway device, the classification of the first user associated with the user device comprises:
   comparing the at least one time interval to usage patterns associated with other users belonging to the classification.

9. The method of claim 1, wherein determining, based on the at least one time interval of the time period during which the user device is connected to the gateway device, the classification of the first user associated with the user device comprises at least one of:
   determining that the first user is an adult; or
   determining that the first user is a child.

10. A method comprising:
    determining usage data of a plurality of user devices over a time period;
    determining, for each of the plurality of user devices, at least one time interval of the time period during which the user device is active;
    comparing the at least one time interval for a first user device of the plurality of user devices to the at least one time interval for a second user device of the plurality of user devices; and determining, based on comparing the at least one time interval for the first user device to the at least one time interval for the second user device, that the first user device and the second user device are associated with a user.

11. The method of claim 10, wherein determining the usage data of the plurality of user devices over the time period comprises collecting, at a gateway device, data indicative of online activity associated with the plurality of user devices over the time period.

12. The method of claim 10, further comprising:
determining, based on determining that the first user device and the second user device are associated with the user, that the first user device and the second user device are associated with a profile associated with the user.

13. The method of claim 10, wherein determining, based on comparing the at least one time interval for the first user device to the at least one time interval for the second user device, that the first user device and the second user device are associated with the user comprises:
determining that the user is a primary user of at least one of the first user device or the second user device.

14. The method of claim 10, wherein determining the usage data of the plurality of user devices over the time period comprises at least one of:
determining an indication of an active connection of the plurality of user devices with respect to time;
determining an indication of an upload volume of the plurality of user devices with respect to time;
determining an indication of a download volume of the plurality of user devices with respect to time; or
determining an indication of a signal strength of the plurality of user devices with respect to time.

15. The method of claim 10, wherein determining, for each of the plurality of user devices, the at least one time interval of the time period during which the user device is active comprises:
fitting, for each user device of the plurality of user devices, the usage data to a regression model; and
extracting, from each regression model, magnitude and time parameters.

16. A method comprising:
determining at least one time period during which a first user device is active;
determining, based on a type of the first user device, a first threshold; and
determining, based on at least one time period during which the first user device is active and the first threshold, a user associated with the first user device.

17. The method of claim 16, further comprising:
determining that the first user device is associated with a profile associated with the user.

18. The method of claim 16, further comprising:
determining at least one time period during which a second user device is active;
determining, based on a type of the second user device, a second threshold that is higher than the first threshold; and
determining, based on the at least one time period during which the second user device is active and the second threshold, a user associated with the second user device.

19. The method of claim 18, wherein the user associated with the second user device is the same as the user associated with the first user device, the method further comprising:
determining that the first user device and the second user device are associated with a profile associated with the user.

20. The method of claim 18, wherein the type of the second user device is different than the type of the first user device.

* * * * *